US012730350B2

(12) United States Patent
Shimshi et al.

(10) Patent No.: US 12,730,350 B2
(45) Date of Patent: Sep. 8, 2026

(54) OPTICAL POINTING AND TRACKING SYSTEM

(71) Applicant: ISRAEL AEROSPACE INDUSTRIES LTD., Lod (IL)

(72) Inventors: Liran Shimshi, Kiryat Ono (IL); Guerman Pasmanik, Bat-Yam (IL)

(73) Assignee: ISRAEL AEROSPACE INDUSTRIES LTD., Lod (IL)

(*) Notice: Subject to any disclaimer, the term of this patent is extended or adjusted under 35 U.S.C. 154(b) by 236 days.

(21) Appl. No.: 18/722,789

(22) PCT Filed: Dec. 21, 2022

(86) PCT No.: PCT/IL2022/051359
§ 371 (c)(1),
(2) Date: Jun. 21, 2024

(87) PCT Pub. No.: WO2023/119279
PCT Pub. Date: Jun. 29, 2023

(65) Prior Publication Data

US 2025/0155771 A1 May 15, 2025

(30) Foreign Application Priority Data

Dec. 23, 2021 (IL) .......................................... 289368
Oct. 23, 2022 (IL) .......................................... 297573

(51) Int. Cl.
*G02F 1/29* (2006.01)
*G01S 17/66* (2006.01)
*H01S 3/10* (2006.01)
*H01S 3/30* (2006.01)

(52) U.S. Cl.
CPC ................ *G02F 1/29* (2013.01); *G01S 17/66* (2013.01); *H01S 3/10076* (2013.01); *H01S 3/30* (2013.01)

(58) Field of Classification Search
CPC ........ G02F 1/29; G01S 17/66; H01S 3/10076; H01S 3/30; B23K 26/0643; B23K 26/21;
(Continued)

(56) References Cited

U.S. PATENT DOCUMENTS 4,102,572 A 7/1978 O'Meara
4,220,928 A 9/1980 Bloom et al.
(Continued)

FOREIGN PATENT DOCUMENTS

IL 228861 A1 2/2014
IL 238321 B 10/2019
RU 2033629 C1 4/1995

OTHER PUBLICATIONS

"Coherent coupling of laser gain media using phase conjugation", D. A. Rockwell and C. R. Giuliano, Optics Letters, vol. 11, No. Mar. 3, 1986 pp. 147-149.
(Continued)

*Primary Examiner* — Tuyen Tra
(74) *Attorney, Agent, or Firm* — FisherBroyles, LLP; Roger L. Browdy

(57) ABSTRACT

A system comprises a probe laser device configured to transmit a probe pulse towards an object, thereby obtaining a reflected probe pulse, a reorientation module including a film polarizer, a medium and a phase conjugate mirror, wherein a path of the reflected probe pulse from its reflection to the film polarizer is designated as a reflected probe path, wherein the reorientation module is operative to use the phase conjugate mirror to generate a phase conjugated reflected probe pulse, which is phase conjugated with the reflected probe pulse, receive, by the medium, the phase conjugated reflected probe pulse, and sequentially, a plurality of pump laser pulses, thereby generating, in the medium, a grating, reflect, using the grating, the plurality of pump laser pulses as a plurality of reoriented pump laser pulses
(Continued)

each exiting the film polarizer along a path coinciding with the reflected probe path, to illuminate the object.

28 Claims, 9 Drawing Sheets

(58) Field of Classification Search
CPC .... B23K 26/04; B23K 26/0622; B23K 26/38; B23K 26/382
USPC .......................................................... 359/298
See application file for complete search history.

(56) References Cited

U.S. PATENT DOCUMENTS

| | | | | |
|---|---|---|---|---|
| 4,321,550 | A | 3/1982 | Evtuhov | |
| 4,527,132 | A | 7/1985 | Huignard | |
| 5,155,542 | A | 10/1992 | Rampolla et al. | |
| 5,420,875 | A | 5/1995 | Sternklar | |
| 5,535,049 | A * | 7/1996 | Bowers | H01S 3/2333 359/334 |
| 7,626,152 | B2 | 12/2009 | King et al. | |
| 2010/0002743 | A1 | 1/2010 | Markov | |
| 2015/0303646 | A1 | 10/2015 | Levy et al. | |
| 2019/0221992 | A1 | 7/2019 | Armand et al. | |
| 2020/0011973 | A1 | 1/2020 | Grasser et al. | |

OTHER PUBLICATIONS

Laser Beam Combining for High-Power, High-Radiance Sources, T. Y. Fan, IEEE Journal of Selected Topics in Quantum Electronics, vol. 11, No. 3, May 2005 pp. 567-577.

Vij, "Phase conjugate laser optics", Arnaud Brignon, Jean-Pierre Huignard, Editors A Wiley-Interscience Publication, pp. 1-424.

D. M. Pepper, D.A. Rockwell and G. J. Dunning, "Nonlinear optical phase conjugation", IEEE Circuits and Devices, pp. 1-153 (1991).

L. Brillouin, Diffusion of Light and X-Rays by a Homogeneous Transparent Body—Influence of Thermal Agitation "Diffusion de la Lumière et des Rayonnes X par un-CorpsTransparent Homògene; Influence de l'Agitation Thermique", Annales des Physique 17, 88 (1922).

C. Wolff et al. , "Brillouin scattering-theory and experiment: tutorial", J. Opt. Soc. Am. B 38 (4), pp. 1-271243 (Mar. 2021).

U. Keller, "Ultrafast solid-state lasers", Landolt-Bornstein, Group VIII Advanced Materials and Technologies 1B1 (Laser Physics and Applications) (see in particular chapter 2.1, p. 1-135, Table 2.1.4).

Can Cui et al, "Demonstration of 2.5 J, 10 Hz, nanosecond laser beam combination system based on non-collinear Brillouin amplification" vol. 26, No. 25 pp. 1-11 | Dec. 10, 2018 | Optics Express 32717.

Elsa Garmire, "Stimulated Brillouin Review: Invented 50 Years Ago and Applied Today", International Journal of Optics, pp. 1-18, Jul. 2018.

Bai et al., "Stimulated Brillouin scattering materials, experimental design and applications: A review", Z., Optical Materials 75 (Aug. 2017) 626-645.

Jin Hong et al: "Stimulated Brillouin Scattering Phase Conjugate Mirror and its Application to Coherent Beam Combined Laser System Producing a High Energy, High Power, High Beam Quality, and High Repetition Rate Output" In: "Advances in Lasers and Electro Optics", Apr. 1, 2010, InTech, XP093220090.

* cited by examiner

OPTICAL POINTING AND TRACKING SYSTEM

TECHNICAL FIELD

This invention relates to the field of optical pointing and tracking systems towards a target.

BACKGROUND

In various technical applications, it is attempted to direct an optical beam, such as a laser beam, towards a target.

In laser applications such as cutting or welding (by melting of material), there is a need for high energy and high-power densities. However, high laser power is a main cause of damage to the optical and laser system components.

An additional challenge is present when the target is a moving target. IL228861 and IL238321 of the Applicant describe a prior art solution to acquire and illuminate a moving target. However, this solution is constrained by the time of flight from the laser to the target and back. For example, an illuminated target located at a range of 6 km is limited by the time of flight at a repetition period of around 40 microseconds.

References considered to be relevant as background to the presently disclosed subject matter are listed below (acknowledgement of the references herein is not to be inferred as meaning that these are in any way relevant to the patentability of the presently disclosed subject matter):

"*Coherent coupling of laser gain media using phase conjugation*", D. A. Rockwell and C. R. Giuliano, OPTICS LETTERS, Vol. 11, No. 3 1986 pp. 147-149;

"*Laser Beam Combining for High-Power, High-Radiance Sources*", T. Y. Fan, IEEE JOURNAL OF SELECTED TOPICS IN QUANTUM ELECTRONICS, VOL. 11, NO. 3, 2005 pp.567-577;

"*Phase conjugate laser optics*", Arnaud Brignon, Jean-Pierre Huignard, Editors A WILEY-INTERSCIENCE PUBLICATION;

"*Nonlinear optical phase conjugation*", D. M. Pepper, D.A. Rockwell and G. J. Dunning, IEEE Circuits and Devices, 21-48 (1991);

L. Brillouin, "*Diffusion de la Lumière et des Rayonnes X par un Corps Transparent Homogéne; Influence de l'Agitation Thermique*", Annales des Physique 17, 88 (1922);

C. Wolff et al., "*Brillouin scattering—theory and experiment: tutorial*", J. Opt. Soc. Am. B 38 (4), 1243 (2021).

Therefore, there is a need in the art for a new optical pointing and tracking system that can alleviate the limitations.

GENERAL DESCRIPTION

In accordance with certain aspects of the presently disclosed subject matter, there is provided a system comprising a probe laser device configured to transmit a probe pulse towards an object, thereby obtaining, after reflection of the probe pulse from a reflection area of the object, a reflected probe pulse, an optical subsystem comprising a reorientation module, wherein the reorientation module comprises a film polarizer, a medium, a phase conjugate mirror, wherein a path of the reflected probe pulse from its reflection by the object up to the film polarizer of the reorientation module is designated as a reflected probe path, a pump laser device configured to transmit at least one sequence of pump laser pulses, wherein the pump laser pulses have a wavelength which match a wavelength of the probe pulse according to a matching criterion, wherein the reorientation module is operative to use the phase conjugate mirror to generate a phase conjugated reflected probe pulse, which is phase conjugated with the reflected probe pulse, receive, by the medium, the phase conjugated reflected probe pulse, and sequentially, a plurality of pump laser pulses of the sequence of pump laser pulses, thereby generating, in the medium, a grating, reflect, using the grating in the medium, the plurality of pump laser pulses as a plurality of reoriented pump laser pulses, wherein each given reoriented pump laser pulse of the plurality of reoriented pump laser pulses exits the film polarizer of the reorientation module along a path coinciding with the reflected probe path, to illuminate the object.

In addition to the above features, the system according to this aspect of the presently disclosed subject matter can optionally comprise one or more of features (i) to (xxvi) below, in any technically possible combination or permutation:

i. an interaction of a given pump laser pulse received by the medium and the phase conjugated reflected probe pulse enables generation of the grating;

ii. during said interaction, the given pump laser pulse received by the medium coincides in space and time with the phase conjugated reflected probe within the medium;

iii. some pump laser pulses of the plurality of pump laser pulses received by the medium after said given pump laser pulse are operative to further sustain or enhance said grating in the medium;

iv. the grating is a Brillouin grating in the medium;

v. the system is configured to, for a single probe pulse transmitted by the probe laser device towards the object and reflected by the object into a reflected probe pulse propagating along a reflected probe path up to the film polarizer of the reorientation module: reflect, using the grating in the medium, the plurality of pump laser pulses as a plurality of reoriented pump laser pulses, wherein each given reoriented pump laser pulse of the plurality of reoriented pump laser pulses exits the film polarizer of the reorientation module along a path coinciding with the reflected probe path, to illuminate the object;

vi. a time interval between transmission of at least some of successive reoriented pump laser pulses of the plurality of reoriented pump laser pulses towards the object is shorter than a round-trip time of the probe pulse;

vii. a power per unit area of each pump laser pulse of the sequence of pump laser pulses is below a damage threshold for which one or more components of the reorientation module, or of the optical subsystem comprising the reorientation module and least one amplifier, is damaged;

viii. the system is configured to amplify the plurality of reoriented pump laser pulses, wherein a power per unit area of each reoriented pump laser pulse after said amplification is below a damage threshold for which one or more components of the reorientation module, or of the optical subsystem comprising the reorientation module and at least one optical amplifier, is damaged;

ix. the system is configured to amplify each given reoriented pump laser pulse of the plurality of reoriented pump laser pulses before it exits the optical subsystem, and transmit the plurality of reoriented pump laser pulses after amplification towards the object to perform an interaction with the object;

x. the object is a moving object;

xi. the sequence of pump laser pulses transmitted by the pump laser device comprises a plurality of pump laser pulses which are coherent according to a coherence criterion;

xii. the medium is operative to receive sequentially a plurality of pump laser pulses of the sequence of pump laser pulses, wherein a time interval between a reception of successive pump laser pulses of the plurality of pump laser pulses by the medium is shorter than a Brillouin Grating lifetime of the medium;

xiii. the medium enables Stimulated-Brillouin-Scattering, wherein the pump laser device is configured to transmit a given laser pulse of the sequence of pump laser pulses to the medium in a time interval that is within a lifetime of a Brillouin grating generated by an interaction between a pump laser pulse and the phase conjugated reflected probe pulse;

xiv. at least some of the pump laser pulses received by the medium are operative to sustain or enhance a Brillouin grating previously generated in the medium;

xv. the system comprises at least one optical amplifier configured to amplify the plurality of reoriented pump laser pulses received by the optical amplifier during an amplification cycle, wherein a total energy of the plurality of reoriented pump laser pulses, after their amplification, for the amplification cycle is equal to or larger than 1 mJ;

xvi. the optical subsystem comprises at least one optical amplifier configured to both amplify the reflected probe pulse, and amplify the plurality of reoriented pump laser pulses;

xvii. the system is configured to trigger an optical amplifier, during a time-window in which the optical amplifier is operative to perform amplification, perform at least once operations including (1) to (9): (1) transmit, by the probe laser device, a probe pulse towards the object, thereby obtaining, after reflection of the probe pulse on a reflection area of the object, a reflected probe pulse, (2) receive, by the optical amplifier, the probe reflected pulse reflected by the object, (3) receive, by the phase conjugation mirror of the reorientation module, the probe reflected pulse after its amplification by the optical amplifier, (4) generate a phase conjugated reflected probe pulse which is phase conjugated with the reflected probe pulse, (5) receive, by the medium the phase conjugated reflected probe pulse, and sequentially a plurality of pump laser pulses of the sequence of pump laser pulses, (6) create, in the medium, a Brillouin Grating, as a result of an interaction of the reflected phase conjugated probe laser pulse and a pump laser pulse of the sequence of pump laser pulses, (7) reflect, by the medium, the plurality of pump laser pulses as a plurality of reoriented pump laser pulses, (8) amplify, by the optical amplifier, the plurality of reoriented pump laser pulses, and (9) use the plurality of reoriented pump laser pulses after their amplification to illuminate the object;

xviii. the optical subsystem comprises at least one optical device configured to both receive the probe reflected pulse, and transmit the plurality of reoriented pump laser pulses after amplification to illuminate the object;

xix. the probe laser device is configured to transmit a first probe pulse towards the object, thereby obtaining, after reflection of the first probe pulse on a first reflection area of the object, a first reflected probe pulse propagating along a first reflected probe path up to the film polarizer of the reorientation module, the pump laser device is configured to transmit a first sequence of pump laser pulses, wherein the reorientation module is operative to use the phase conjugate mirror to generate a first phase conjugated reflected probe pulse, which is phase conjugated with the first reflected probe pulse, receive sequentially a plurality of pump laser pulses of the first sequence of pump laser pulses, reflect, using the medium, the plurality of pump laser pulses as a plurality of first reoriented pump laser pulses exiting the film polarizer of the reorientation module along a path coinciding with the first reflected probe path, to illuminate the object, the probe laser device is configured to transmit a second probe pulse towards the object, thereby obtaining, after reflection of the second probe pulse on a second reflection area of the object, a second reflected probe pulse propagating along a second reflected probe path up to the film polarizer of the reorientation module, the pump laser device is configured to transmit a second sequence of pump laser pulses, wherein the reorientation module is operative to use the phase conjugate mirror to generate a second phase conjugated reflected probe pulse, which is phase conjugated with the second reflected probe pulse, receive sequentially a plurality of pump laser pulses of the second sequence of pump laser pulses, reflect, using the medium, the plurality of pump laser pulses as a plurality of second reoriented pump laser pulses exiting the film polarizer of the reorientation module along a path coinciding with the second reflected probe path, to illuminate the object, wherein a time interval between reception of a last laser pulse of the first sequence of pump laser pulses by the reorientation module and reception of a first laser pulse of the second sequence of pump laser pulses by the reorientation module is longer than the Brillouin Grating lifetime of the medium;

xx. the medium is an active Stimulated Brillouin Scattering (SBS) medium;

xxi. a frequency of transmission of the pump laser pulses within the sequence by the pump laser device is between 100 MHz and 2 GHz;

xxii. the probe laser device is mounted on a first platform, and the pump laser device is mounted on a second platform which is distinct from the first platform;

xxiii. the matching criterion the matching criterion is such that the absolute value of a spectral shift between the probe laser device and the pump laser device is smaller than half of the sum of a spectral width of the probe laser device and a spectral width of the pump laser device;

xxiv. the phase conjugate mirror comprises a medium comprising a first material, the medium of the reorientation module comprises a second material, wherein the first material and the second material are identical;

xxv. the medium of the reorientation module comprises a liquid, wherein the liquid optionally includes at least one of CBrCl3, CHCl3, GeCl4, CCl4, C2Cl4, SiCl4, (CH3)3CCl, CS2, TiCl4, ICl, IF5, C6F14, CSe2, AsCl3, Acetone, H2O and Freon, or a gaseous material, or a solid crystal; and xxvi. for a first object illuminated by a first probe pulse, a first reflected probe pulse is generated which it is received by the optical subsystem with a first incidence angle $\alpha_1$, wherein a path of the first reflected probe pulse from its reflection by the object up to a film polarizer of the reorientation module is designated as a first reflected probe path, wherein the reorientation module is configured to generate first reoriented pump laser pulses, wherein each given reoriented pump laser pulse of the plurality of first reoriented pump laser pulses exits the film polarizer of the reorientation module along a path coinciding with the first reflected probe path, to illuminate the first object, for a second object illuminated by a second probe pulse, a second reflected probe pulse is generated, which it is received by the optical subsystem with a second incidence angle $\alpha_2$ different from $\alpha_1$, wherein a path of the second reflected probe pulse from its reflection by the object up to a film polarizer of the reorientation module is designated as a second reflected probe path, wherein the reorientation module is configured to generate second reoriented pump laser pulses, wherein each given reoriented pump laser pulse of the plurality of second reoriented pump laser pulses exits the film polarizer of the reorientation module along a path coinciding with the second reflected probe path, to illuminate the object, wherein the system enables maintaining a fixed orientation of the optical subsystem to illuminate the first object with the first reoriented pump laser pulses and the second object with the second reoriented pump laser pulses.

In accordance with certain aspects of the presently disclosed subject matter, there is provided a method comprising transmitting a probe pulse towards an object, thereby obtaining, after reflection of the probe pulse from a reflection area of the object, a reflected probe pulse, receiving the reflected probe pulse by an optical subsystem comprising a reorientation module, wherein the reorientation module comprises a film polarizer, a medium, a phase conjugate mirror, wherein a path of the reflected probe pulse from its reflection by the object up to the film polarizer of the reorientation module is designated as a reflected probe path, generating, by the reorientation module, a phase conjugated reflected probe pulse, which is phase conjugated with the reflected probe pulse, receiving, by the medium the phase conjugated reflected probe pulse, and sequentially, a plurality of pump laser pulses of a sequence of pump laser pulses generated by a pump laser device, thereby generating, in the medium, a grating, wherein the pump laser pulses have a wavelength which match a wavelength of the probe pulse according to a matching criterion, reflecting, using the grating in the medium, the plurality of pump laser pulses as a plurality of reoriented pump laser pulses, wherein each given reoriented pump laser pulse of the plurality of reoriented pump laser pulses exits the film polarizer of the reorientation module along a path coinciding with the reflected probe path, to illuminate the object.

In addition to the above features, the method according to this aspect of the presently disclosed subject matter can optionally comprise (or implements) one or more of the features (i) to (xxvi) as described above with respect to the system.

According to some embodiments, the method comprises measuring a round trip time of at least one preliminary probe pulse transmitted towards the object to determine a distance to the object, thereby enabling determining arrival time of one or more subsequent probe pulses reflected by the object.

According to some embodiments, the proposed solution enables to illuminate a target with a plurality of laser pulses closely spaced in time, thereby reducing the time response of the system.

According to some embodiments, the proposed solution ensures a high energy interaction with the target while preventing damages caused to the optical and laser system components.

According to some embodiments, the proposed solution enables to track a target efficiently and accurately.

According to some embodiments, the proposed solution enables tracking a moving target while ensuring a substantially continuous physical interaction with the target.

According to some embodiments, the proposed solution enables tailoring various parameters of the laser beams reaching the target.

BRIEF DESCRIPTION OF THE DRAWINGS

In order to understand the invention and to see how it can be carried out in practice, embodiments will be described, by way of non-limiting examples, with reference to the accompanying drawings, in which.

DETAILED DESCRIPTION

In the following detailed description, numerous specific details are set forth in order to provide a thorough understanding of the invention. However, it will be understood by those skilled in the art that the presently disclosed subject matter can be practiced without these specific details. In other instances, well-known methods have not been described in detail so as not to obscure the presently disclosed subject matter.

The term “processor and memory circuitry” (PMC) covers any computing unit or electronic unit with data processing circuitry that may perform tasks based on instructions stored in a memory, such as a computer, a server, a chip, a processor, etc. It encompasses a single processor or multiple processors, which may be located in the same geographical zone or may, at least partially, be located in different zones and may be able to communicate together.

Embodiments of the presently disclosed subject matter are not described with reference to any particular programming language. It will be appreciated that a variety of programming languages can be used to implement the teachings of the presently disclosed subject matter as described herein.

Figure 1:
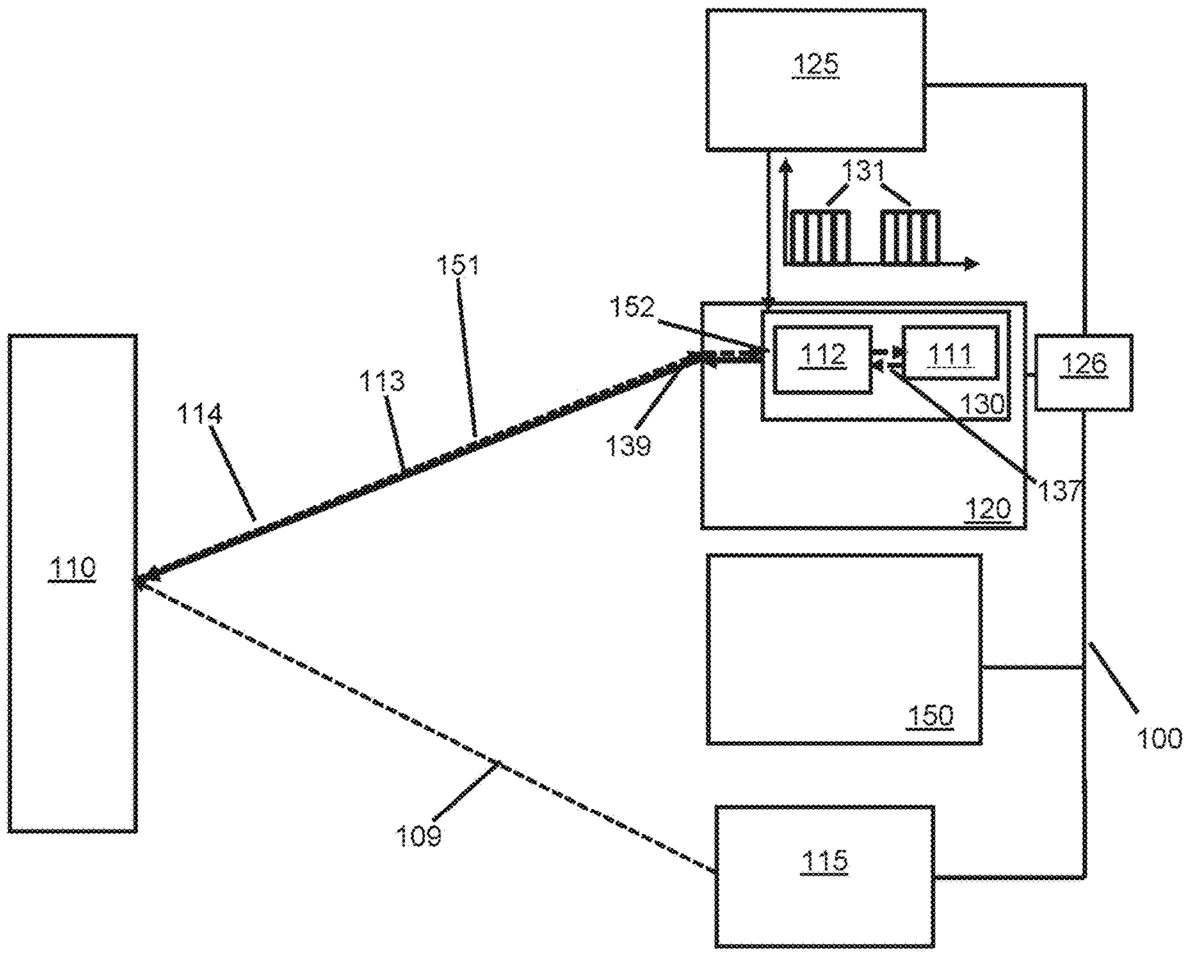
FIG. 1 illustrates an embodiment of a system which can be used to illuminate an object.

FIG. 1 is a schematic representation of an embodiment of a system 100, that can be used to illuminate an object 110 (target).

According to some embodiments, the object 110 can be a static object.

According to some embodiments, the object 110 can be a moving object. In some embodiments, the moving object is a ground or sea-borne or air-borne moving object.

According to some embodiments, the object does not necessarily move along a known route. According to some embodiments, the moving object rotates (about at least one of pitch, roll or yaw axes).

System 100 includes a probe laser device 115. According to some embodiments, the probe laser device 115 is configured to transmit a probe pulse 109 towards the object 110.

At least part of the probe pulse 109 is reflected by an area 114 of the object 110 (the area 114 can correspond to the tip of the object 110), thereby obtaining a reflected probe pulse 113.

System 100 further includes an optical subsystem 120, which includes a reorientation module 130 (also called optical reorientation module 130).

As explained hereinafter, the reorientation module 130 enables to reorient a sequence 131 of pump laser pulses (which did not previously interact with the object 110) towards the object 110.

As explained hereinafter, the reorientation module 130 includes a phase conjugate mirror (see reference 111 in FIG. 1 or reference 211 in FIG. 2) an active medium (see reference 112 in FIG. 1 or reference 212 in FIG. 2) enabling Stimulated Brillouin Scattering.

The reflected probe pulse 113 is collected, at least partially, by the optical subsystem 120.

An optical path of the reflected probe pulse 113, from its reflection by the object 110 (as mentioned above, the reflected probe pulse 113 is generated after reflection of the probe pulse 109 by the object 110) up to a point 152 of the reorientation module 130 (see also FIG. 1B), is designated as a reflected probe path 151. The point 152 can correspond to a film polarizer (located at the entrance of the reorientation module 130 or 230). This film polarizer is depicted as reference 241 in FIG. 2. As explained hereinafter, the film polarizer is operative to receive the reflected probe pulse 113 and pump laser pulses transmitted by a pump laser device 125 (described hereinafter). According to some embodiments, the film polarizer is a thin film polarizer. The term "thin" can include a thickness of about a micrometer per layer, wherein the polarizer can be a single layer polarizer or a multiple layer polarizer.

System 100 further includes (or is operatively coupled with) a second laser device, called pump laser device 125.

As explained hereinafter, the pump laser device 125 is configured to transmit at least one sequence 131 of pump laser pulses. As visible in the non-limitative representation of FIG. 1, each sequence 131 includes a plurality of closely spaced in time distinct pump laser pulses. As explained hereinafter, the pump laser device 125 is operative to generate and transmit a plurality of distinct sequences 131 of pump laser pulses.

According to some embodiments, a wavelength $\lambda_1$ of the probe pulse 109 (transmitted by the probe laser device 115) and a wavelength $\lambda_2$ of each pump laser pulse (transmitted by the pump laser device 125) match according to a matching criterion.

According to some embodiments, the matching criterion is e.g., such that the absolute value of the spectral shift between the two lasers, the probe laser device 115 and the pump laser device 125, having their peaks respectively at $\lambda_1$ and $\lambda_2$, is smaller than half of the sum of the spectral widths of the two lasers $\Delta\lambda(1/e)$, i.e., smaller than $0.5(\Delta\lambda(1/e)_1+\Delta\lambda(1/e)_2)$, where $\Delta\lambda(1/e)_1$ is the spectral width of the probe laser device 115 and $\Delta\lambda(1/e)_2$ is the spectral width of the pump laser device 125, each measured between the two 1/e points on the spectral curve of the laser, in which the spectral envelope reaches 1/e of its maximum. This matching criterion allows for at least partial overlap of the spectrum of the two lasers (probe laser device 115 and pump laser device 125). Note that a matching criterion different from the example provided above can be used.

According to some embodiments, the probe laser device 115 is mounted on a first platform, and the pump laser device 125 (together with the optical subsystem 120) is mounted on a second platform which is distinct from the first platform (the first platform is therefore separated from the second platform).

This is not limitative, and in some embodiments, the probe laser device 115 and the pump laser device 125 (together with the optical subsystem 120) can be mounted on the same platform (e.g., on one pedestal).

Figure 3:
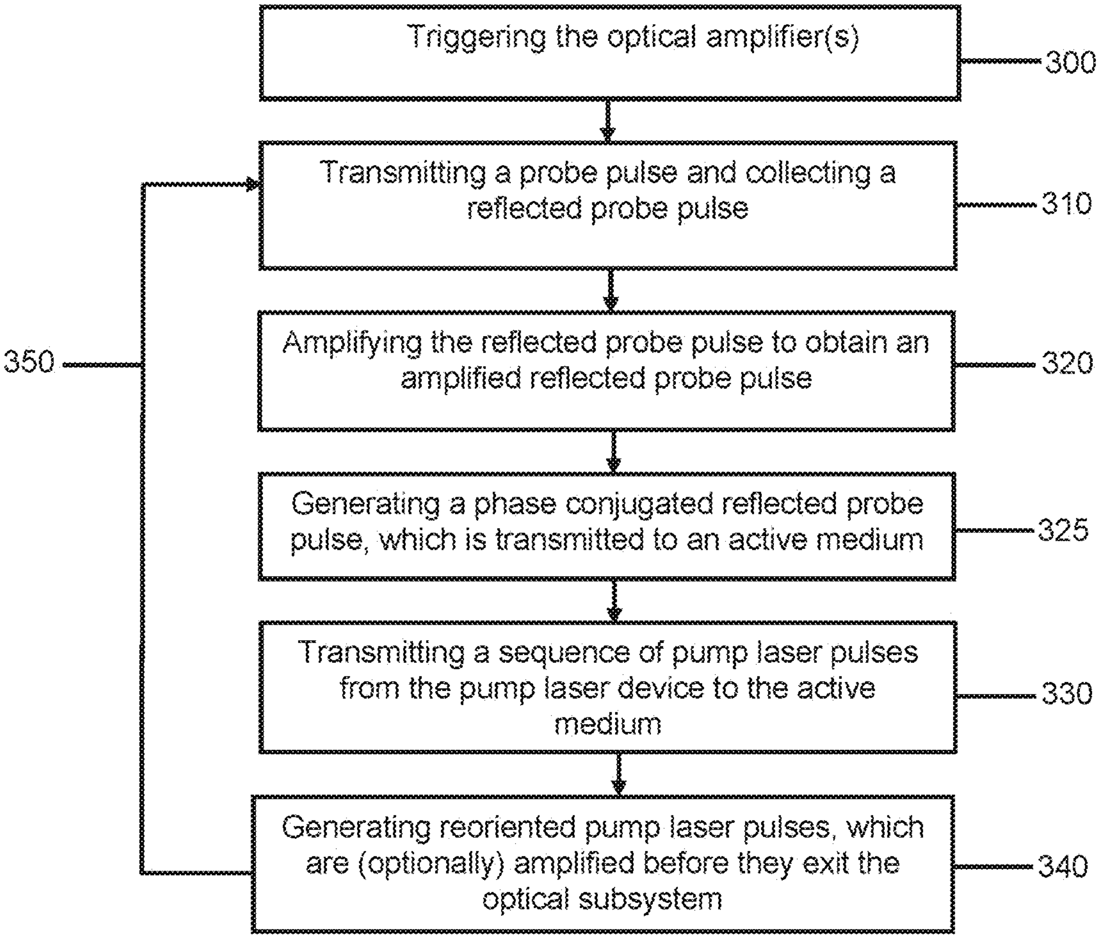
FIG. 3 illustrates an embodiment of a method of illuminating an object using the optical subsystem of FIG. 2.

Time synchronization between the probe laser device 115 and the system including the pump laser device 125 and the optical subsystem 120 can be obtained as explained e.g., with reference to FIG. 3.

According to some embodiments, the pump laser device 125 includes a Nd:YAG laser source having wavelength 1.06 microns (this is however not limitative, and other laser types and wavelengths can be used).

According to some embodiments, the pump laser device 125 includes a repetitively pulsed laser, e.g., mode-locked laser or a Q-switched laser.

A non-limitative example of a laser device which can be used as the pump laser device 125 can be found in "Ultrafast solid-state lasers", Landolt-Börnstein, Group VIII Advanced Materials and Technologies 1B1 (Laser Physics and Applications) (see in particular chapter 2.1, "Ultrafast solid-state lasers by U. Keller", p. 70, Table 2.1.4). Content of this document is incorporated by reference herein in its entirety.

According to some embodiments, the probe laser device 115 comprises a pulsed laser having sufficient energy so as to obtain useful returns from the target, and the pump laser device 125 comprises the repetitively pulsed seed for a high energy laser. In particular, in some embodiments, an energy of the probe pulse 112 can be smaller than an energy of each laser pulse of the sequence 131 of pump laser pulses. This is however not limitative.

According to some embodiments, an energy of the probe pulse 109 is in a range between several milli-Joules to several Joules. This is however not limitative. In some embodiments, this energy can be selected depending on the range to the object 110, to ensure that the optical subsystem 120 receives a reflected probe pulse 113 with sufficient energy (above a detection threshold of the optical subsystem 120).

According to some embodiments, the different pump laser pulses of a given sequence 131 of pump laser pulses are coherent according to a coherence criterion.

Figure 2:
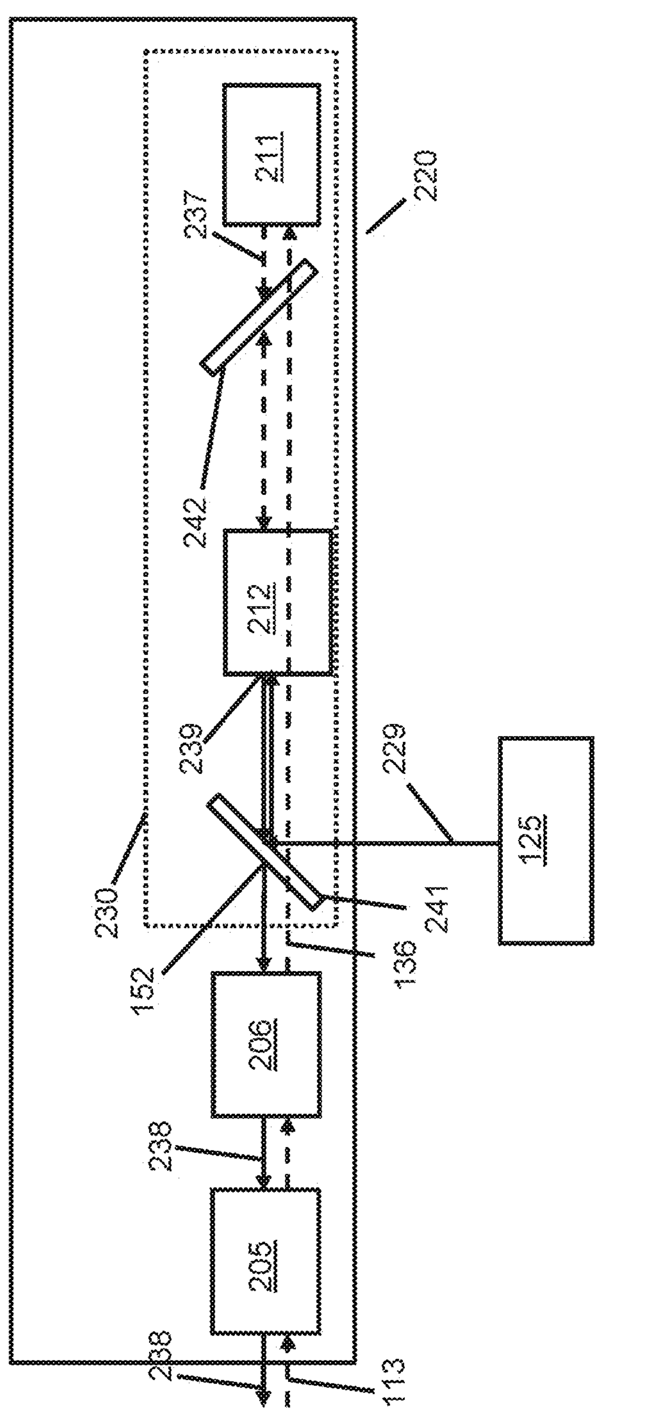
FIG. 2 is a layout of an embodiment of an optical subsystem which can be used in the system of FIG. 1 or FIG. 1A.

In a non-limitative example, the coherence criterion is such that the coherence length is equal to or greater than the length of an active medium (see for example medium 112 in FIG. 1 or medium 212 in FIG. 2—its length can be measured along an optical axis along which the laser beams counter propagate within the medium) of the reorientation module 130 (note that in FIG. 2 the reorientation module has reference number 230).

In a non-limitative example, the length of the active medium 112/212 of the reorientation module 130/230 is between a few centimetres and 100 cm.

The reorientation module 130 is configured to receive the reflected probe pulse 113. According to some embodiments, the reorientation module 130 receives the reflected probe pulse 113 after its amplification.

In addition, the medium 112 of the reorientation module 130 is configured to receive sequentially a plurality of pump laser pulses of at least one sequence 131 of pump laser pulses transmitted by the pump laser device 125.

According to some embodiments, system 100 includes (or is operatively coupled to) a processor and memory circuitry (PMC) 126. PMC 126 can communicate with one or more components of system 100. In particular, in some embodiments, PMC 126 can control timing of one or more components of system 100.

According to some embodiments, system 100 can include (or can be operatively coupled with) various sensors/devices 150 enabling e.g., engagement with the object 110 and/or detection of the object 110 and/or acquisition of the object 110, such as a RADAR, a Forward-looking infrared (FLIR) camera, a visible camera, etc.

Figure 1A:
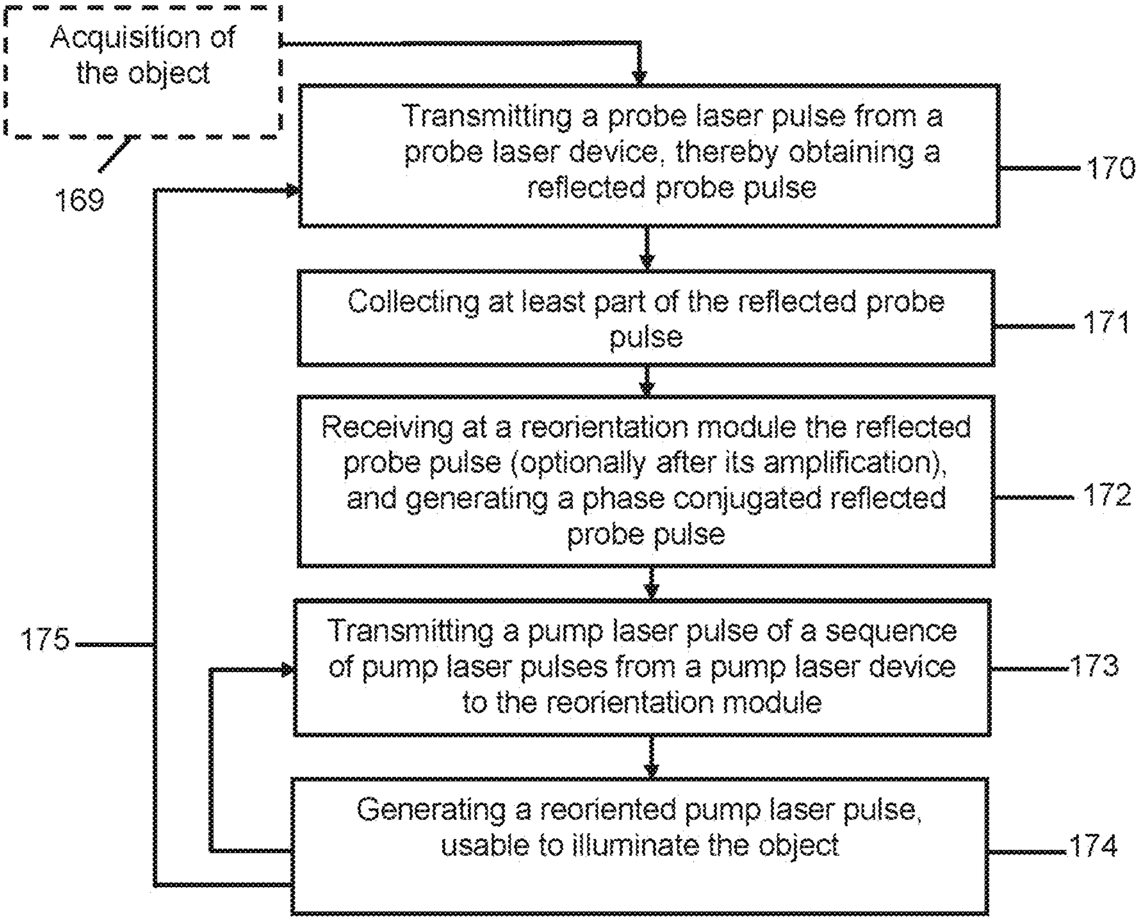
FIG. 1A illustrates an embodiment of a method of illuminating an object using the system of FIG. 1.

Attention is drawn to FIG. 1A which describes a method of operation of system 100 of FIG. 1. FIG. 1C describes an example of a control of the timing of the various laser pulses.

The method includes transmitting (operation 170) a probe laser pulse (see reference 109 in FIGS. 1, 1B and 1C) towards the object 110. Reflection of the probe laser pulse by the object 110 yields a reflected probe pulse 113.

The method further includes (operation 171) collecting, by the optical subsystem 120, at least part of the reflected probe pulse 113 reflected by area 114 of the object 110, which is transmitted (optionally after its amplification) to the reorientation module 130.

As shown in FIG. 1C (note that the time scale in FIG. 1C is purely schematic and does not necessarily reflect the real time scale), a time interval between transmission of the probe pulse 109 and reception of the reflected probe pulse 113 by the reorientation module 130 (or 230 in FIG. 2) is noted $\Delta t_1$. $\Delta t_1$ corresponds substantially to the round-trip time of the probe pulse 109.

Figure 1B:
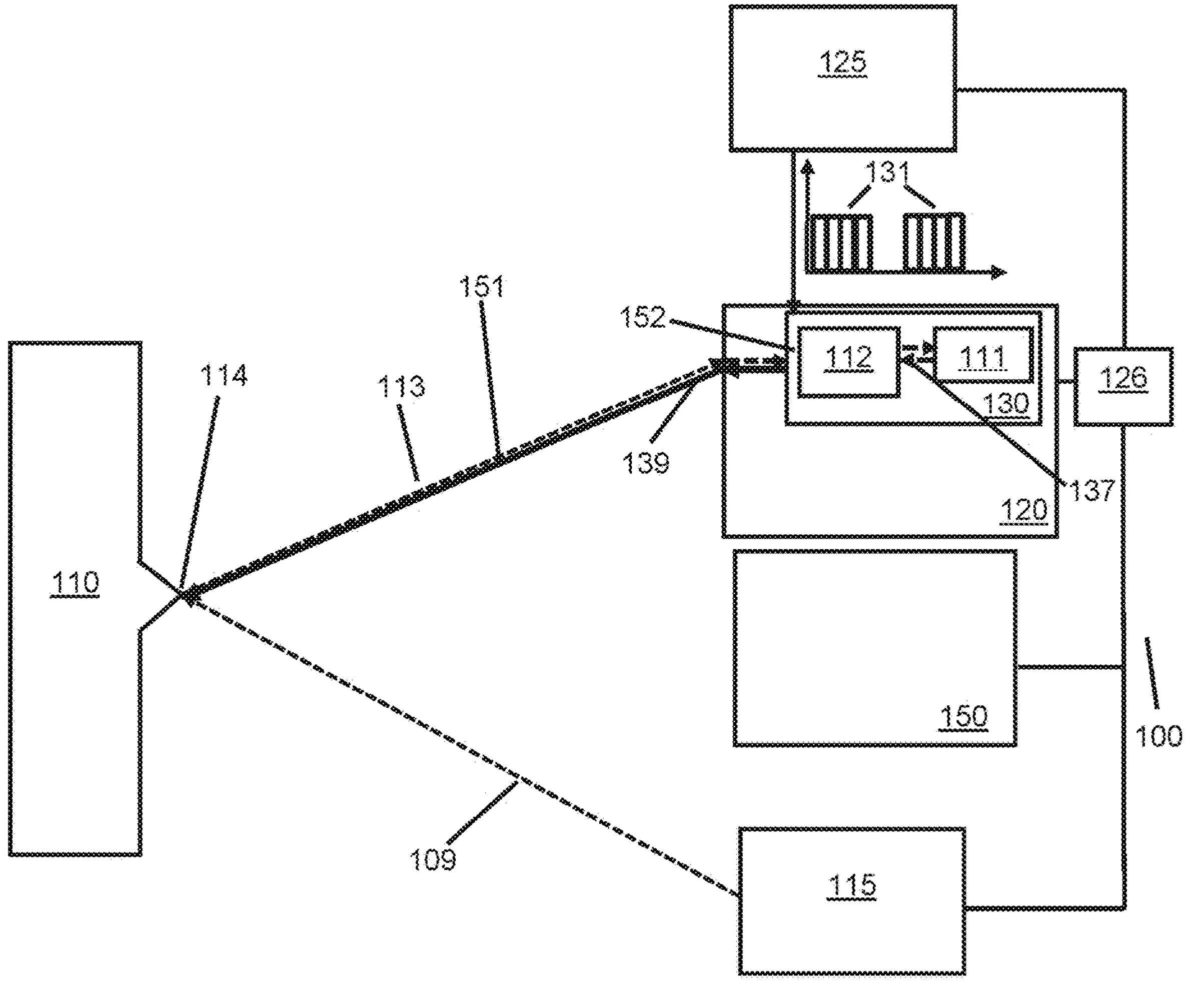
FIG. 1B illustrates a variant of the embodiment described in FIG. 1.
Figure 1C:
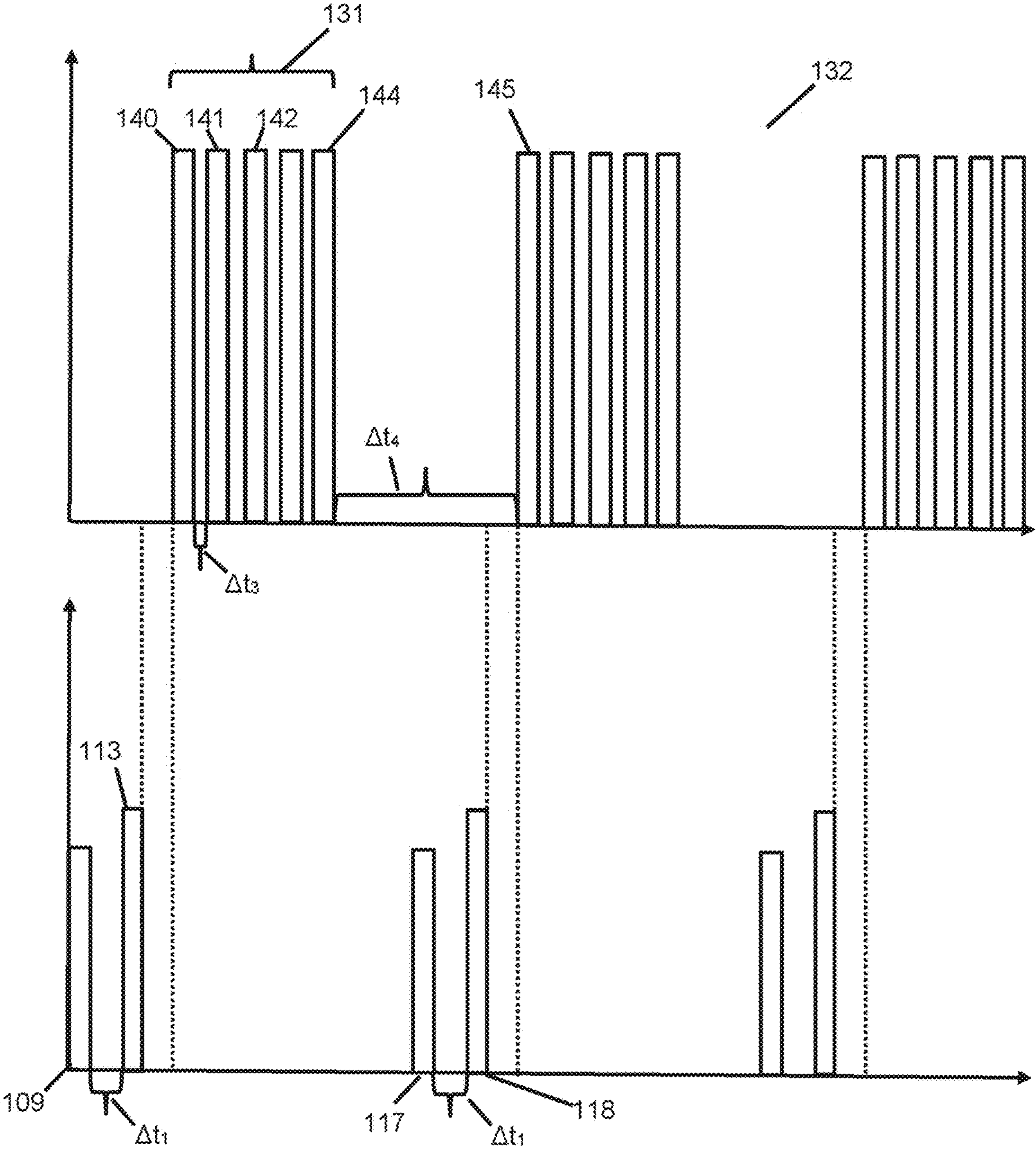
FIG. 1C illustrates an example of time multiplexing of various laser pulses in accordance with the method of FIG. 1A.

In some embodiments, and as depicted in FIG. 1B, area 114 corresponds to the area of the object 110 that defines the shortest optical path between the probe laser device 115, the object 110 and the optical subsystem 120. For example, in FIG. 1B, area 114 corresponds to a tip 114 protruding from the object 110, or to any other distinct reflective element.

According to some embodiments, the reflected probe pulse 113 is received by the medium of the reorientation module 130. The medium is particular in that it enables, at least according to some embodiments, Stimulated Scattering. Stimulated Scattering can include e.g., Stimulated Brillouin Scattering.

The medium can include e.g., a solid crystal, or a liquid or a gas.

According to some embodiments, the medium of the reorientation module 130 includes a liquid such as at least one of (used as a pure component or within a mixture) CBrCl3, CHCl3, GeCl4, CCl4, C2Cl4, SiCl4, (CH3)3CCl, CS2, TiCl4, ICl, IF5, C6F14, CSe2, AsCl3, Acetone, H2O and Freon. Note that the use of a liquid or gaseous material for the medium reduces the need of cooling the medium. This is not limitative and as mentioned above, the medium can include a solid crystal (e.g., quartz), or a gas.

Since interaction between the reflected probe pulse 113 and the medium 112 (or 212 in FIG. 2) have no effect, the reflected probe pulse 113 impinges on a phase conjugate mirror (see reference 111 in FIG. 1A or reference 211 in FIG. 2) and is reflected (operation 172) as a phase conjugated reflected probe pulse 137 (or 237 in FIG. 2). The phase conjugated reflected probe pulse 137 (or 237 in FIG. 2) is then transmitted to the medium 112 (or 212 in FIG. 2).

According to some embodiments, the phase conjugate mirror 111 (or 211) comprises a medium (active medium, which enables e.g., SBS—note that this medium is not represented in the drawings) which contains a material which is identical to a material of the active medium 112 (or 212). This assures efficient energy transfer from the pump laser pulses to the reoriented pump laser pulses.

According to some embodiments, when the reflected probe pulse 113 enters the optical subsystem 120, it can have an optical aberration due to atmospheric turbulence disturbances present in the environment between the object 110 and the optical subsystem 120. This optical aberration can be cancelled by the phase conjugate mirror 111 (or 211). As a consequence, according to some embodiments, the phase conjugated reflected probe pulse 137 (or 237) does not include this optical aberration. This is due to inherent properties of the phase conjugate mirror.

The method further includes transmitting (operation 173) a first pump laser pulse 140 of a sequence 131 of pump laser pulses from the pump laser device 125 to the reorientation module 130 (or 230). Note that the various pump laser pulses of the sequence 131 do not necessarily have the same energy.

The phase conjugated reflected probe pulse 137 (or 237) interacts, in the medium 112 (or 212), with at least one pump laser pulse (e.g., the first pump laser pulse of the sequence 113, or with one or more of the first pump laser pulses of the sequence 113) transmitted by the pump laser device 215 to the medium 112 (or 212). During the interaction, there is a coincidence in time and space within the medium between the phase conjugated reflected probe pulse 137 (237) and the first pump laser pulse 140.

The interference interaction between the phase conjugated reflected probe pulse 137 (or 237) and the first pump laser pulse 140 creates an interference grating inside the medium 112 (or 212), called "Brillouin Grating". The grating causes Stimulated Brillouin Scattering.

Since the grating decays over time, the Stimulated Brillouin Scattering exists only during a given lifetime. In a regular medium (which is not further stimulated), after the given lifetime has elapsed, Stimulated Brillouin Scattering vanishes and ceases to exist. According to some embodiments, in the present system, the given lifetime is extended by the interaction of consecutive pump laser pulse(s) with the medium, which sustains the Brillouin Grating within the medium. This results in a system in which the constraint of the limited lifetime of the Brillouin grating is (at least partially) alleviated. Note that at least some of the pump laser pulses may enhance/stimulate the grating in the medium. In some embodiments, as long as the medium receives pump laser pulses, the grating is sustained or enhanced within the medium.

The given lifetime depends in particular on the material(s) present in the medium, and is known per material. The given lifetime is noted hereinafter "Brillouin grating lifetime". Note that this given lifetime can be also equivalently designated as "phonon lifetime".

Document "Phase conjugate laser optics", Arnaud Brignon, Jean-Pierre Huignard, Editors A WILEY-INTERSCIENCE PUBLICATION, provides, for a large variety of SBS materials, the corresponding Brillouin grating lifetime (see p. 32-33, $\tau_B$ in Table 2.1, Table 2.2 and Table 2.3). Content of this document is incorporated herein by reference in its entirety.

Since the interaction between the first pump laser pulse 140 of the sequence 131 and the phase conjugated reflected probe pulse 137 (or 237) in the medium 112 (or 212) creates a grating within the medium 112 (or 212), the first pump laser pulse 140 is reflected by the medium 112 (or 212) as a reoriented pump laser pulse 139 (or 239) which has acquired phase properties (i.e., directional and phase front properties) of the reflected probe pulse 113.

As a consequence, the first pump laser pulse 140 exits the optical subsystem 120 as a reoriented pump laser pulse 139 (or 238 in the embodiment of FIG. 2, in which the reoriented pump laser pulse 239 exiting the reorientation module 230 is, optionally, amplified before it exits the optical subsystem 220). The reoriented pump laser pulse 139 exits the film polarizer (visible in FIG. 2 as reference 241, but not explicitly represented in FIGS. 1, 1B and 6 for simplifying the drawings) of the reorientation module 130 along a path which coincides with the reflected probe path 151. Note that this coincidence also covers the situation in which the optical subsystem 120/220 is moving over time, which may create a neglectable difference between the two paths, since the laser pulses propagate at the speed of light.

If the target is static, the reoriented pump laser pulse 139 (or 238) impinges the target at the same area at which the probe pulse has been reflected by the object 100. If the object 100 is mobile, there can be a small shift between the impact area of the reoriented pump laser pulse 139 (or 238) on the object 100 and the area at which the probe pulse has been reflected by the object 100.

As depicted in FIG. 1A, the method includes transmitting another pump laser pulse (second pump laser pulse 141, which is generated by the pump laser device 125 after the first pump laser pulse 140 within the first sequence 131 of laser pulses) from the second laser device 125 to the reorientation module 130.

As depicted in FIG. 1C, a time interval between reception of the first pump laser pulse 140 by the reorientation module 130 and reception of the second pump laser pulse 141 by the reorientation module 130 is noted $\Delta t_3$. More generally, a time interval between a reception of successive pump laser pulses of a sequence of pump laser pulses by the reorientation module 130 is noted $\Delta t_3$. Note that $\Delta t_3$ is not necessarily a fixed value within a given sequence of pump laser pulses and/or among different sequences of pump laser pulses.

As mentioned above, the Brillouin grating within the medium (which enables Stimulated Scattering within the medium) is initiated by the interaction between the phase conjugated reflected probe pulse 137 (or 237) and the first pump laser pulse of the sequence 131, designated as pump laser pulse 140. Reception of the following pump laser pulses (see pump laser pulses 141, 142, etc. of the sequence 131) by the reorientation module 130 enables sustaining (and may even enhance) this grating (and therefore of the Stimulated Scattering initially generated by the interaction between the phase conjugated reflected probe pulse 137 or 237 and the pump laser pulse 140 within the medium) over time.

Therefore, according to some embodiments, $\Delta t_3$ is selected to ensure that the second pump laser pulse 141 is received by the reorientation module 130 (or 230) while the Brillouin grating within the medium is still present. As a consequence, reception of the second pump laser pulse 141 by the reorientation module 130 (or 230) enables sustaining the Brillouin grating over time.

This can be ensured by selecting a time interval $\Delta t_3$ between a reception of successive pump laser pulses of the sequence 131 by the reorientation module 130 (or 230) which is shorter than a lifetime of the Brillouin grating generated within the medium. By the effect of the grating induced by the reorientation module 130 (or 230), the pump laser pulse 141 is therefore converted into a reoriented pump laser pulse, which has acquired the phase properties of the phase conjugated reflected probe pulse 137 or 237 (and therefore of the reflected probe pulse 113). As a consequence, the reoriented pump laser pulse exits the film polarizer (see point 152) of the reorientation module 130 and then the optical subsystem 120 along a path which coincides with the reflected probe path 151.

According to some embodiments, the reoriented pump laser pulse can be amplified before it exits the optical subsystem 120. As a consequence, the reoriented pump laser pulse reaches the object 110 after its amplification.

As mentioned above, if the target is static, the reoriented pump laser pulse impinges the target at the same area at which the probe pulse has been reflected by the object 100 (and at which the previously transmitted reoriented pump laser pulse has impinged the object 100). If the object 100 is mobile, there can be a small shift between the impact area of the reoriented pump laser pulse on the object 100 and the area at which the probe pulse has been reflected by the object 100 (and the area at which the previously transmitted reoriented pump laser pulse has impinged the object 100).

The method as described above can be repeated for the subsequent pump laser pulses of the first sequence 131 of pump laser pulses. If amplifiers are used (see hereinafter embodiments which use amplifiers), the method can be repeated for the subsequent pump laser pulses of the first sequence 131 of laser pulses as long as the amplifiers are not exhausted.

As mentioned above, each subsequent pump laser pulse of the first sequence 131 received by the medium 112 (or 212) sustains a Brillouin grating in the medium 112 (or 212).

As a consequence, the first sequence 131 of pump laser pulses is converted into a sequence of a plurality of reoriented pump laser pulses that have acquired the phase properties of the phase conjugated reflected probe pulse 137 (or 237).

Each given reoriented pump laser pulse of the plurality of reoriented pump laser pulses exits the film polarizer (see point 152) of the reorientation module 130 and then the optical subsystem 120 along a path coinciding with the reflected probe path 151, to illuminate the object. Note that this coincidence also covers the situation in which the optical subsystem 120/220 is moving over time, which may create a neglectable difference between the two paths, since the laser pulses propagate at the speed of light.

Note that, typically, the first reoriented pump laser pulse (generated using the first pump laser pulse 140) has an intensity which is smaller than the intensity of the second reoriented pump laser pulse (generated using the second pump laser pulse 141). Indeed, the Brillouin grating in the medium may be further stimulated by at least some of the subsequent pump laser pulses which reach the medium. This is however not limitative.

In some embodiments, the object 110 is a moving target. However, according to some embodiments, the travelling distance of the moving object 110 within the total duration of a given sequence of laser pulses is small, which ensures transmitting the plurality of reoriented pump laser pulses towards the same area of the object 110.

As apparent from the description above, for a single probe pulse 109 transmitted towards the object 110 (and reflected by the object 110 into a reflected probe pulse 113), a plurality of reoriented pump laser pulses is generated (which have phase properties of the probe pulse 113) and transmitted (if necessary, after their amplification) towards the object 110 (in particular, in some embodiments, towards the same area 114).

It is therefore possible to transmit successively towards the object 110 a plurality of reoriented pump laser pulses which are closely spaced in time.

As a consequence, an interaction with the area of the object 110 is achieved. In particular, according to some embodiments, an interaction which enables removal of material is achieved. The interaction can include (this is not limitative) at least one of cutting, welding, drilling, etc. at the area. This interaction can be used for various applications, such as manufacturing an object (e.g., a car), etc. This is however not limitative.

According to some embodiments, the interval between two successive reoriented pump laser pulses (see e.g., 139) transmitted towards the object 110 and enabling an interaction with the object 110 is much shorter than the round-trip time of the probe pulse 109 (e.g., 0.5 ns between laser pulses, compared to 40 μs round-trip time, i.e., 8 thousand times shorter—these values are however not limitative)

This is depicted in FIG. 1C in which a time interval $\Delta t_3$ between transmission of successive pump laser pulses of the sequence 131 of pump laser pulses (which are converted into reoriented pump laser pulses transmitted towards the object 110) is shorter than a time interval $\Delta t_1$ between transmission of the probe pulse 109 by the probe laser device 115 and reception of the phase conjugated reflected probe pulse by the reorientation module 130.

According to some embodiments, it is required to obtain a high energy interaction with the object 110. On the other hand, generating a high energy laser beam may damage one or more components of the system 100.

Therefore, a power per unit area (also called specific power) of each pump laser pulse of the sequence 131 of pump laser pulses can be selected to be below a damage threshold (also called laser damage threshold, or laser induced damaged threshold) of one or more components (such as optical components, e.g., lenses, mirrors, laser rods, optical coatings, etc., and/or amplifiers) or all components, of the reorientation module 130/230 (or more generally of the optical subsystem 120/220 which includes the reorientation module 130/230), thereby preventing damage to the one or more components of the reorientation module 130/230 (or more generally of the optical subsystem 120/220).

In some embodiments, and as explained hereinafter, each pump laser pulse of the sequence of pump laser pulses is (after a process of interacting within an active SBS medium) amplified, to obtain an (amplified) reoriented pump laser pulse having the same properties as the phase conjugated reflected probe pulse 137 (or 237).

Therefore, power per unit area of each amplified reoriented pump laser pulse can be selected to be below the damage threshold of one or more components (such as optical components, e.g., lenses, mirrors, optical coatings, etc., and/or amplifiers), or all components, of the reorientation module 130 or 230 (or more generally of the optical subsystem 120 or 220), thereby preventing damage to the one or more components.

Power per unit area of each amplified reoriented pump laser pulse depends in particular on the energy of each pump laser pulse of the sequence 131 of pump laser pulses, on the duration of each pump laser pulse and on the amplitude of the amplification.

According to some embodiments, although each reoriented pump laser pulse does not damage optical components of the optical module 120 or 220, a useful interaction (see examples above) can be achieved due to the cumulative effect (e.g., heat absorption etc.) of the successive multiple reoriented pump laser pulses impinging the same spot on object 110 during a short period of time, e.g., a few nanoseconds.

A non-limitative example of a damage threshold is provided hereinafter. Assume that a pulsed laser transmits a pulsed laser beam to a Nd:YAG rod. A damage threshold of coatings of the Nd:YAG rod can be, for a pulse duration shorter than 20 ns, around 1.4 $GW/cm^2$. This example is not limitative.

On the other hand, as mentioned above, it is required in some applications to generate a high energy interaction with the object 110. Since the plurality of reoriented pump laser pulses which are transmitted towards the object 110 can be closely spaced in time, the total accumulated energy of the plurality of reoriented pump laser pulses is large enough to ensure the required high energy and sufficient high-power density (note that use of a single laser pulse beam with such high energy and power density would damage one or more components of the reorientation module 130 or 230, or more generally of the optical subsystem 120 or 220).

According to some embodiments, a temporal frequency of transmission (as transmitted by the pump laser device 125—this frequency is substantial equal to the frequency of pump laser pulses reception by the reorientation module 130/230) of pump laser pulses within a given sequence 131 of pump laser pulses is between 100 MHz and 2 GHz (that is to say that the time duration $\Delta t_3$ between two successive pump laser pulses of the sequence 131 is between 0.5 ns and 10 ns). As mentioned above, this value generally depends on the lifetime of the Brillouin grating. The values provided above are therefore not limitative and depend on various constraints, such as the required application, the environment, etc.

According to some embodiments, for a given sequence 131 of pump laser pulses, the pulse duration of the various pump laser pulses of the given sequence is substantially constant among the various pump laser pulses.

According to some embodiments, for a given sequence 131 of pump laser pulses, the pulse duration of each pump laser pulse of the given sequence 131 is shorter than the time duration $\Delta t_3$ between transmission of two successive pump laser pulses of the sequence 131.

As visible in FIG. 1A (see reference 175), the method can be repeated. In particular, once all laser pulses of the first sequence 131 of pump laser pulses have been converted into reoriented pump laser pulses and transmitted towards the object 110, a second probe laser pulse 117 (see FIG. 1C—different from the probe pulse 109) is transmitted from the pump laser device 115 towards the object 110, thereby obtaining a second reflected probe pulse.

The method further includes receiving (operation 172), at the reorientation module 130 (or 230), the second reflected probe pulse 118 (in some embodiments, the second reflected probe pulse is first amplified before it reaches the reorientation module 130 or 230).

The method further includes transmitting (operation 173) successively a plurality of pump laser pulses of a second sequence 132 of pump laser pulses, which are converted into a sequence of reoriented pump laser pulses (which have acquired the phase properties of the second probe laser pulse 117). The plurality of reoriented pump laser pulses is transmitted towards the same area of the object 110 as illuminated by the second probe laser pulse 117, or towards an area of the object 110 shifted with respect to the area of the object 110 as illuminated by the second probe laser pulse 117.

Control of the timing of the various laser pulses can be similar to the first iteration of the method.

As visible in FIG. 1C, time multiplexing between the various sequences 131, 132 of pump laser pulses and the various probe pulses 109, 117 transmitted by the probe laser device 115 can be obtained.

In particular, a time interval $\Delta t_4$ between reception of a last pump laser pulse 144 of the first sequence 131 of pump laser pulses by the reorientation module 130 (or 230) and reception of a first laser pulse 145 of the subsequent second sequence 132 of pump laser pulses by the reorientation module 130 (or 230) is longer than a period of time $\Delta t_1$ between a transmission of the second probe pulse 117 by the probe laser device 115 and reception of the second probe pulse 117 by the reorientation module 130 (or 230). In other words, between two consecutive sequences of pump laser pulses, there is sufficient time for a round-trip between the probe laser device 115, the object 110, and the optical subsystem 120 (or 220). This enables recreating a grating within the medium based on the second probe pulse 117.

In some embodiments, the method of FIG. 1A can include an initial phase of acquiring (operation 169) the object 110. This can include using e.g., one or more of the sensors 150 mentioned above.

Attention is now drawn to FIG. 2, which depicts an embodiment of an optical subsystem 220 (corresponding to a possible embodiment of optical subsystem 120 visible in FIGS. 1 and 1B).

Optical subsystem 220 includes optics 205. Optics 205 can be configured to collect light reflected by the object 110 and/or to transmit light towards the object 110. Optics 205 can include e.g., mirror(s), a telescope, lenses, etc.

Optical subsystem 220 includes at least one amplifier 206 (optical amplifier). In some embodiments, optical subsystem 220 includes a plurality of optical amplifiers 206 arranged in series, or in parallel, or both in series and in parallel.

In a non-limitative example, optical amplifier 206 includes one or more Nd:YAG rod amplifiers (e.g., flash lamp or diode pumped amplifiers). This is however not limitative and other type(s) of optical amplifier(s) can be used, such as e.g., a laser pumped Brillouin amplifier (see "Demonstration of 2.5 J, 10 Hz, nanosecond laser beam combination system based on non-collinear Brillouin amplification" by CAN CUI et al, Vol. 26, No. 25|10 Dec. 2018|OPTICS EXPRESS 32717—content of this document is incorporated herein by reference in its entirety).

Optical subsystem 220 can include various optical element(s) which can be used to direct/transmit the various laser beams that travel within the optical subsystem 220, such as beam splitter(s), mirror(s), polarizer (see 241), etc.

Optical subsystem 220 further includes a reorientation module 230 (reorientation module 230 is a possible embodiment of the reorientation module 130 of FIGS. 1 and 1B).

The reorientation module 230 includes a phase conjugate mirror 211 (also called SBS phase conjugate mirror).

Principles and examples of phase conjugate mirrors are described e.g., in "*Stimulated Brillouin Review: Invented* 50 *Years Ago and Applied Today*", Elsa Garmire. Content of this document is incorporated herein by reference in its entirety.

The reorientation module 230 further includes a medium 212 which enables (as mentioned above with reference to FIG. 1) Stimulated Scattering. Stimulated Scattering can include e.g., Stimulated Brillouin Scattering. Non-limitative examples of materials which can be used in medium 212 have been provided above.

The reorientation module 230 further includes one or more film polarizers (see e.g., film polarizers 241 and 242 in FIG. 2). The film polarizers 241 and 242 are arranged such that the medium 212 is located between the film polarizer 241 and the film polarizer 242.

Film polarizer 241 lets the reflected probe pulse 113 (return pulse from the target 110—note that the reflected probe pulse 113 can be amplified by the optical amplifier 206, see reference 136 at the output of the optical amplifier 206) reach the active medium 212 and then the phase conjugate mirror 211, which is then reflected back towards the active medium 212 (see phase conjugated reflected probe pulse 237).

Film polarizer 241 reflects the pump laser pulses 229 of the pump laser device 125 (these pump laser pulses are also represented as reference 131 in FIG. 1) towards the active medium 212.

The interaction between at least one pump laser pulse 229 (e.g., the first) and the reflected probe pulse 237 within the medium 212 creates a Brillouin grating in the active medium 212.

Once the Brillouin grating has been created, the subsequent pump laser pulses which reach the active medium 212 provide additional energy to the active medium 212 (this operation is also called "pumping"), while the Brillouin grating (previously created as mentioned above) still exists in the active medium 212.

These pump laser pulses are reflected back from the medium 212 as reoriented pump laser pulses 239 that are transmitted, after their amplification, towards the object 110 (see amplified reoriented pump laser pulses 238). According to some embodiments, film polarizer 242 can be set to deflect the pumping laser pulses (pumping laser pulses of the pump laser device 125 reflected by film polarizer 241) out of the optical path (e.g. along a direction that does not coincide with the optical path along which the laser pulses propagate) to avoid saturation of the phase conjugate mirror 211 at times that the Brillouin grating does not exist in the medium 212 (this deflection of the pumping pulses out of the optical path is not represented in FIG. 2).

Optical subsystem 220 can include different and/or additional elements, which are not necessarily depicted in FIG. 2 (such as amplifiers for additional amplification of the laser pulses transmitted by the pump laser device 125).

For example, optical subsystem 220 can include in the optical channel Pockels' cells and/or Faraday rotators as isolators for suppression of photon noise, which are not depicted in FIG. 2.

According to some embodiments, optical subsystem 220 can include power supplies, cooling devices, rugged optical benches, etc. (not depicted in FIG. 2).

The specific arrangement of the optical subsystem 220 and/or of the reorientation module 230 as described with reference to FIG. 2 is not limitative, and other architecture(s) (using additional and/or different components) can be used, depending on the needs.

Attention is now drawn to FIG. 3, which depicts a method of illuminating an object, using the optical subsystem 220.

Timing of the various events as described hereinafter can be e.g., managed by the PMC 126.

The method can include triggering (operation 300) the optical amplifiers 206. In particular, the optical amplifiers 206 are generally triggered before the reflected probe 113 (see FIG. 1) is collected by the optics 205.

In some embodiments, in order to be able to trigger in time the optical amplifiers 206, the method can include a preliminary estimation of the distance to the object 110. In some embodiments, this can include measuring the round trip of at least one preliminary probe pulse transmitted by the probe laser device 115 (the round trip corresponds to the time for the preliminary probe pulse 109 to hit the object 110, and to be collected by the optical subsystem 120/220 after its reflection). For a stationary object, or a slow-moving object, this estimation can be performed once. For a fast-moving object, this estimation can be updated periodically. During this preliminary estimation, the preliminary probe pulse 109 is not used to trigger illumination of the object by a plurality of closely spaced in time laser pulses.

This enables determining arrival time of one or more subsequent probe pulses reflected by the object 110.

Triggering of the optical amplifiers 206 can include triggering of flash lamps or pumping laser diodes which are associated with the optical amplifiers 206.

The method further includes transmitting (310) a probe pulse from the probe laser device 115 to the object 110, which is reflected by the object 110 into a reflected probe pulse 113. The method includes collecting the reflected probe pulse 113 and amplifying (320) the probe reflected pulse 113 using the optical amplifiers 206 (see amplified probe reflected pulse 136).

The amplified reflected probe pulse 136 is transmitted to the reorientation module 230. In particular, the amplified reflected probe pulse 136 is transmitted to the phase conjugate mirror 211, which produces a phase conjugated reflected probe pulse 237 (operation 325).

The phase conjugated reflected probe pulse 237 is transmitted to the medium 212.

The method further includes transmitting (330) a sequence 131 of pump laser pulses from the pump laser device 125 to the medium 212. The laser pulses of the sequence 131 are transmitted sequentially to the medium 212 (as visible e.g., in FIG. 1C).

The reflected probe phase conjugated pulse 237, together with the first pump pulse transmitted by the pump laser device 125 to the medium 212, create a Brillouin grating within the medium 212.

By virtue of Stimulated Scattering within the medium 212, each laser pulse of the sequence 131, after it exits the reorientation module 230 as reoriented pump laser pulse 239 (operation 340), acquires the phase properties of the phase conjugated reflected probe pulse 237.

Principles of Stimulated Brillouin Scattering are described e.g., in "*Stimulated Brillouin scattering materials, experimental design and applications: A review*", Z. Bai et al., Optical Materials 75 (2018) 626-645. Content of this document is incorporated herein by reference in its entirety.

Each reoriented pump laser pulse 239 is then amplified (operation 340) using the optical amplifiers 206 to obtain an amplified reoriented pump laser pulse 238 which is transmitted towards the object 110 using the optics 205.

As explained hereinafter, the method can be repeated (see reference 350). In particular, and as explained hereinafter with reference to FIG. 4, within a given time window (amplification cycle) in which the optical amplifiers 206 are operative to perform amplification, operations 310 to 340 can be repeated.

An optical path of the reflected probe pulse 113, from its reflection by the object 110 up to the film polarizer 241 of the reorientation module 130, is designated as a reflected probe path (see 151 in FIG. 1). As mentioned above, by virtue of phase conjugation, the reoriented pump laser pulse 239 (which is subsequently amplified into an amplified reoriented pump laser pulse 238) exits the film polarizer 241 of the reorientation module along 230 along a path coinciding (in counter-direction) with the reflected probe path. FIG. 2 represents a portion of each of these two paths as different for clarity reasons, but in practice, they do coincide.

According to some embodiments, the amplified reoriented pump laser pulses 238 are transmitted towards the same area at which the first probe pulse 109 illuminated the object 110. A reorientation of the pump laser pulses of the sequence 131 of pump laser pulses towards the object 110 is therefore achieved.

In this embodiment, the optical amplifiers 206 are operative to amplify both the first reflected probe pulse 113 and each of the reoriented pump laser pulses 239 for illuminating the object 110.

The ability of the optical amplifiers 206 to perform amplification is limited in time and follows a certain periodicity. Assume that a given time window in which the optical amplifiers 206 can perform amplification has a time duration noted $\Delta t_{amp}$ (amplification cycle). After this time window, a waiting time has to elapse until the optical amplifiers 206 are ready and can be used again for amplification. $\Delta t_{amp}$ depends on various factors, such as power supply connected to the optical amplifiers 206, cooling technology used for the optical amplifiers 206, etc. Depending on the type of amplifiers and their number, according to some embodiments, within a given time window (of length $\Delta t_{amp}$) of amplification, one or more sequences of amplified reoriented pump laser pulse 238 are transmitted towards the object 110, wherein the total energy of these one or more sequences in the given time window is equal to or greater than 1 millijoule (e.g., between 1 millijoule and 5 Kilojoules). These values are not limitative.

Figure 4:
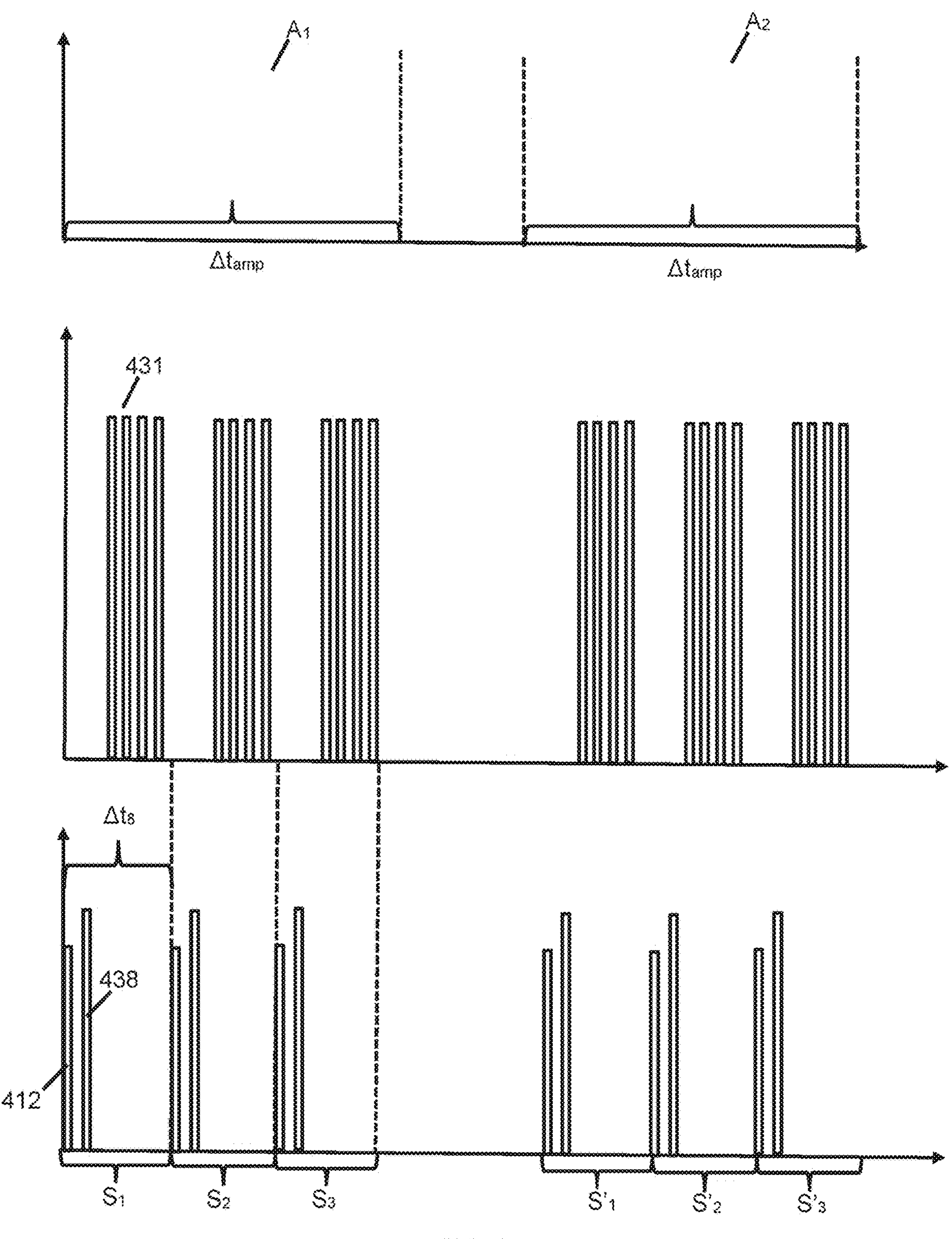
FIG. 4 illustrates an example of time multiplexing of various laser pulses in accordance with the method of FIG. 3.

Attention is now drawn to the non-limitative example of FIG. 4.

The upper graph of FIG. 4 depicts cycles of amplification of the optical amplifiers 206.

During the first period of time $\Delta t_{amp}$, it is possible to perform three (this value is not limitative and is provided as an example only) sequences $S_1$, $S_2$, $S_3$ of illumination of the object. In each sequence, a probe pulse (see 412) is transmitted towards the object and a reflected probe pulse is collected. The reflected probe pulse is amplified and transmitted (see reference 438) to the reorientation module 230, which converts the reflected probe pulse into a phase conjugated reflected probe pulse. A sequence 431 of closely spaced in time pump laser pulses is transmitted to the reorientation module 230. Interaction of a pump laser pulse with the phase conjugated reflected probe pulse creates a Brillouin grating within the medium 212.

The sequence of pump laser pulses is therefore reflected by the medium into a plurality of reoriented pump laser pulses, which are then amplified and transmitted towards the object 110.

Similarly, during a second period of time $\Delta t_{amp}$, it is possible to perform three (this value is not limitative and is provided as an example only) sequences $S'_1$, $S'_2$ and $S'_3$ of illumination of the object.

For example, assume that $\Delta t_{amp}$ is approximately equal to 250 μs (this is not limitative). In some embodiments, the frequency at which a new amplification cycle (see A1, A2, etc. in FIG. 4) of the optical amplifiers 206 is triggered is up to 1 KHz.

$\Delta t_{amp}$ is much longer than the round-trip time of light from the system to the object 110. Therefore, it is possible to illuminate the object 110 with three probe laser pulses 109, spaced apart e.g., by a time interval $\Delta t_8$ of 60 μs. This value is not limitative, and in some embodiments the frequency at which the successive probe laser pulses 109 are transmitted towards the object 110 is up to tens of KHz (e.g., 30 KHz, this value being not limitative). This frequency depends in particular on the distance from the system 100 to the object 110 and the depletion of the amplifiers.

The duration of each sequence 131/431 of pump laser pulses and the time interval between the pump laser pulses within the sequence depend in particular on physical properties of the medium 212.

Various different parameters/patterns can be selected for illuminating the object, in particular the number of pump laser pulses of each sequence, the timing of the pump laser pulses, energy of the pump laser pulses, etc. Selection of these parameters/patterns can be performed e.g., to meet constraints provided e.g., by an operator.

For example, in a given sequence 131/431 of pump laser pulses, the number of pump laser pulses can be increased. As a consequence, a higher number of amplified reoriented pump laser pulses is transmitted towards the object. However, power density of each amplified reoriented pump laser pulse is reduced.

Total energy of the pump laser pulses of a given sequence of pump laser pulses is limited e.g., by constraints of heating within the system.

Figure 5A:
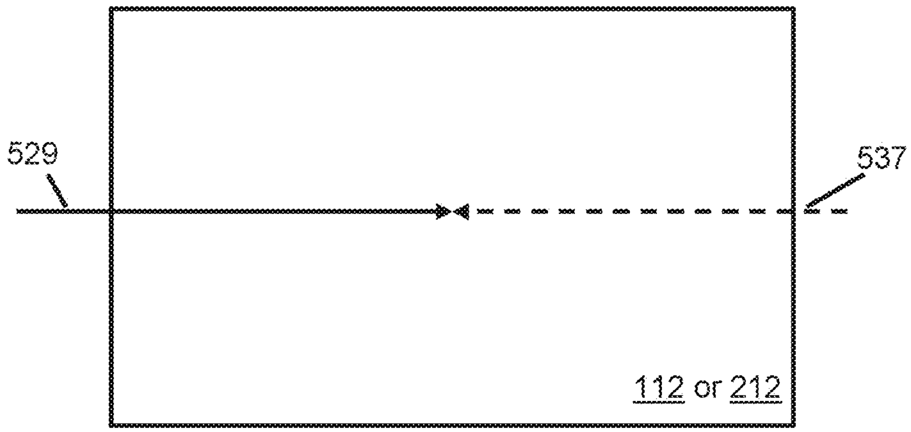
FIG. 5A illustrates an example of interaction which can occur in a medium of a reorientation module, in order to generate a grating.

Attention is now drawn to FIG. 5A.

According to some embodiments, the phase conjugated reflected probe pulse (represented as 537 in FIG. 5A) and the first pump laser pulse(s) 529 which reach the medium 112 or 212 propagate along the same optical path within the medium 112 or 212 (in counter-(opposite) directions). In this configuration, the interaction in space and time between the phase conjugated reflected probe pulse and the first pump laser pulse(s) is the highest.

This is however not limitative. According to some embodiments, the reflected probe pulse is received with a given angle of incidence $\alpha_1$ by the optical subsystem 120/220. As a consequence, the phase conjugated reflected probe pulse 537 is received by the active medium 112 or 212 with this angle $\alpha_1$. Therefore, it can occur that the phase conjugated reflected probe pulse 537 and the first pump laser pulse(s) 529 which reach the medium 112 or 212 propagate along optical paths which are not parallel, as visible in FIG. 5B. The smaller the angle $\alpha_1$, the longer is the distance (and the longer the duration) along which there is an interaction (overlap) of the two pulses 537 and 529.

Figure 5B:
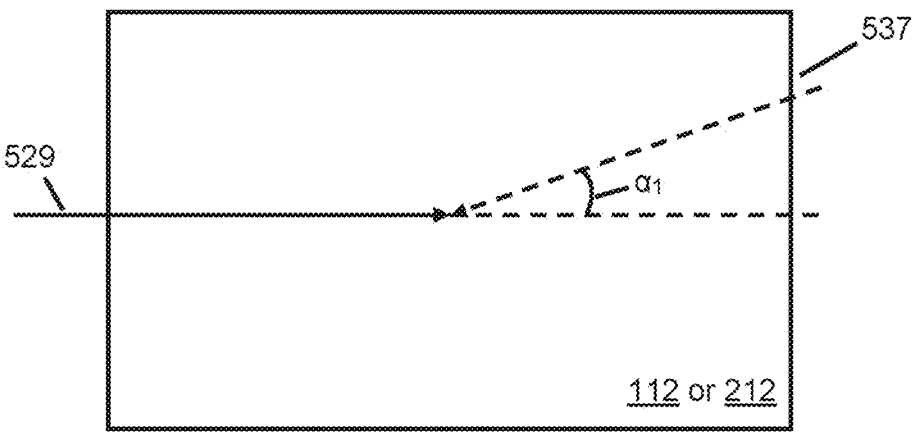
FIG. 5B illustrates another example of interaction which can occur in the medium of the reorientation module, in order to generate a grating.

Note that even in the configuration of FIG. 5B, the reoriented pump laser pulses generated using the grating present in the medium 212 acquire the phase properties of the reflected probe pulse. Therefore, when the reoriented pump laser pulses exit the film polarizer (see 241 in FIG. 2) of the reorientation module 130/230, they propagate along the same path as the reflected probe pulse (along the reverse direction).

Figure 6:
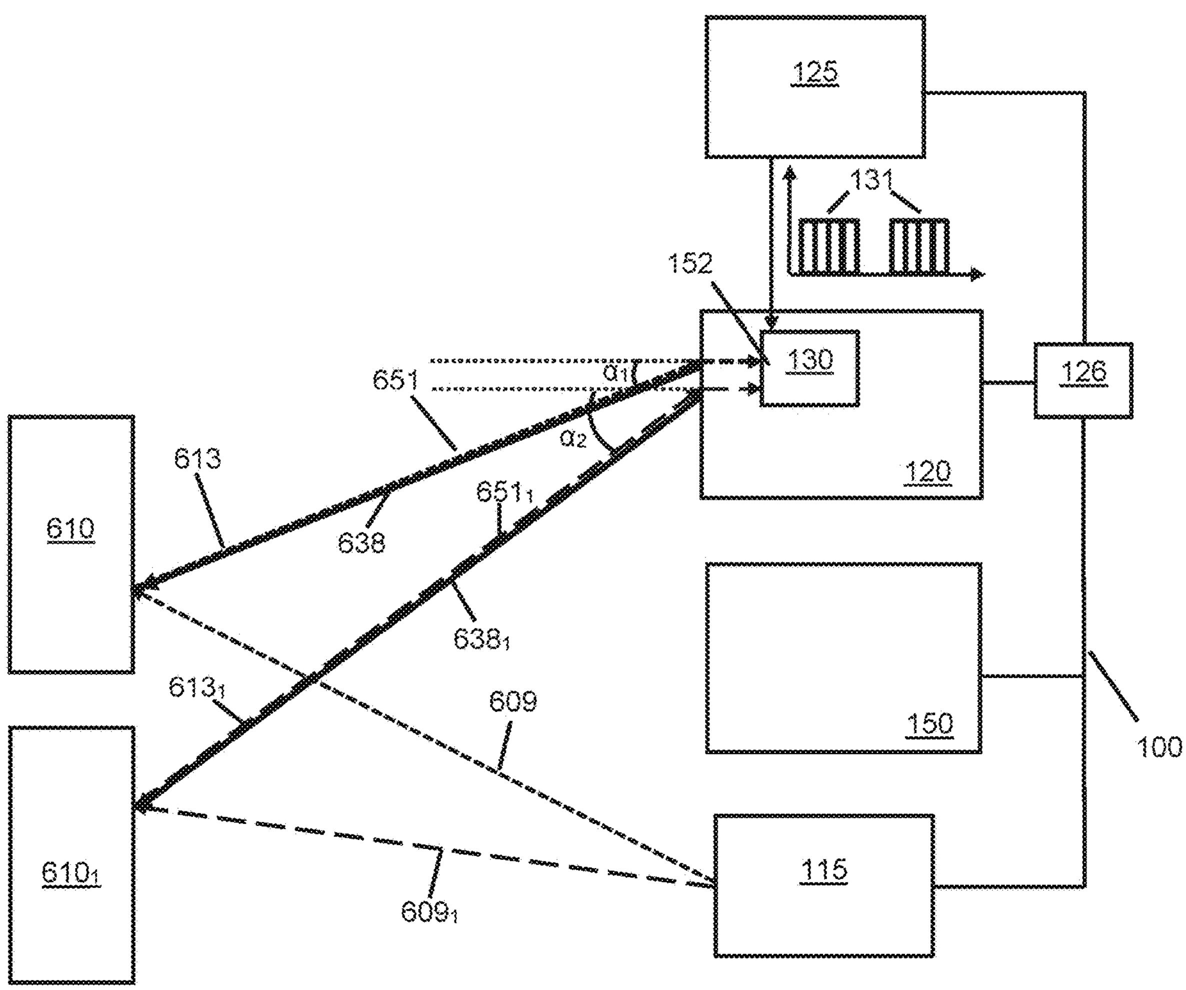
FIG. 6 illustrates an example of illuminating successively two objects which have a different angular direction with respect to the optical subsystem, without requiring modifying the orientation of the optical subsystem.

This is beneficial, as explained with reference to the non-limitative example of FIG. 6.

Assume that a first object 610 is illuminated by a first probe pulse 609. As a consequence, a first reflected probe pulse 613 is generated, which is received by the optical subsystem 120 with a first incidence angle $\alpha_1$. A path of the first reflected probe pulse 613 from its reflection by the object up to a film polarizer of the reorientation module 130 is designated as a first reflected probe path 651.

As explained in the various embodiments above, the reorientation module 130 is operative to generate first reoriented pump laser pulses 638, wherein each given reoriented pump laser pulse of the plurality of first reoriented pump laser pulses 638 exits the film polarizer (see 241 in FIG. 2) located at the entrance of the reorientation module 130 along a path coinciding (in counter-direction) with the first reflected probe path 651, to illuminate the first object 610.

Assume that a second object $\mathbf{610}_1$ is illuminated by a second probe pulse $\mathbf{609}_1$. As a consequence, a second reflected probe pulse $\mathbf{613}_1$ is generated, which is received by the optical subsystem 120 with a second incidence angle $\alpha_2$ different from $\alpha_1$.

A path of the second reflected probe pulse $\mathbf{613}_1$ from its reflection by the object up to a film polarizer of the reorientation module 130 is designated as a second reflected probe path $\mathbf{651}_1$.

The reorientation module 130 is configured to generate second reoriented pump laser pulses $\mathbf{638}_1$, wherein each given reoriented pump laser pulse of the plurality of second reoriented pump laser pulses $\mathbf{638}_1$ exits the film polarizer (see 241 in FIG. 2) located at the entrance of the reorientation module 130 along a path coinciding (in counter-direction) with the second reflected probe path $\mathbf{651}_1$, to illuminate the second object $\mathbf{610}_1$.

Note that the first object 610 and the second object $\mathbf{610}_1$ are illuminated by the optical subsystem one after the other, and not simultaneously.

In the example above, although the different objects have a different angular direction in the field of view of the optical subsystem 120, it not required to modify the orientation of the optical subsystem in order to illuminate the first object and the second object using reoriented pump laser pulses. To the contrary, the system enables maintaining a fixed orientation of the optical subsystem to illuminate the first object with the first reoriented pump laser pulses and the second object with the second reoriented pump laser pulses. Note that this does not prevent from changing the orientation of the optical subsystem, but this is not mandatory, as explained above.

The invention contemplates a computer program being readable by a computer for executing at least part of one or more methods of the invention. The invention further contemplates a machine-readable memory tangibly embodying a program of instructions executable by the machine for executing at least part of one or more methods of the invention.

It is to be noted that the various features described in the various embodiments can be combined according to all possible technical combinations.

It is to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based can readily be utilized as a basis for designing other structures, methods, and systems for carrying out the several purposes of the presently disclosed subject matter.

Those skilled in the art will readily appreciate that various modifications and changes can be applied to the embodiments of the invention as hereinbefore described without departing from its scope, defined in and by the appended claims.

The invention claimed is:

1. A system comprising:

a probe laser device configured to transmit a probe pulse towards an object, thereby obtaining, after reflection of the probe pulse from a reflection area of the object, a reflected probe pulse, an optical subsystem comprising a reorientation module, wherein the reorientation module comprises a film polarizer, a medium, a phase conjugate mirror, wherein a path of the reflected probe pulse from its reflection by the object up to the film polarizer of the reorientation module is designated as a reflected probe path, a pump laser device configured to transmit at least one sequence of pump laser pulses, wherein the pump laser pulses have a wavelength which match a wavelength of the probe pulse according to a matching criterion, wherein the reorientation module is operative to:

use the phase conjugate mirror to generate a phase conjugated reflected probe pulse, which is phase conjugated with the reflected probe pulse, receive, by the medium:

the phase conjugated reflected probe pulse, and sequentially, a plurality of pump laser pulses of the sequence of pump laser pulses, thereby generating, in the medium, a grating, reflect, using the grating in the medium, the plurality of pump laser pulses as a plurality of reoriented pump laser pulses, wherein each given reoriented pump laser pulse of the plurality of reoriented pump laser pulses exits the film polarizer of the reorientation module along a path coinciding with the reflected probe path, to illuminate the object.

2. The system of claim 1, wherein an interaction of a given pump laser pulse received by the medium and the phase conjugated reflected probe pulse enables generation of the grating.

3. The system of claim 2, wherein, during said interaction, the given pump laser pulse received by the medium coincides in space and time with the phase conjugated reflected probe within the medium.

4. The system of claim 2, wherein some pump laser pulses of the plurality of pump laser pulses received by the medium after said given pump laser pulse are operative to further sustain or enhance said grating in the medium.

5. The system of claim 1, wherein the grating is a Brillouin grating in the medium.

6. The system of claim 1, configured to, for a single probe pulse transmitted by the probe laser device towards the object and reflected by the object into a reflected probe pulse propagating along a reflected probe path up to the film polarizer of the reorientation module:

reflect, using the grating in the medium, the plurality of pump laser pulses as a plurality of reoriented pump laser pulses, wherein each given reoriented pump laser pulse of the plurality of reoriented pump laser pulses exits the film polarizer of the reorientation module along a path coinciding with the reflected probe path, to illuminate the object.

7. The system of claim 1, wherein a time interval between transmission of at least some of successive reoriented pump laser pulses of the plurality of reoriented pump laser pulses towards the object is shorter than a round-trip time of the probe pulse.

8. The system of claim 1, wherein a power per unit area of each pump laser pulse of the sequence of pump laser pulses is below a damage threshold for which one or more components of the reorientation module, or of the optical subsystem comprising the reorientation module and least one amplifier, is damaged.

9. The system of claim 1, configured to amplify the plurality of reoriented pump laser pulses, wherein a power per unit area of each reoriented pump laser pulse after said amplification is below a damage threshold for which one or more components of the reorientation module, or of the optical subsystem comprising the reorientation module and at least one optical amplifier, is damaged.

10. The system of claim 1, configured to:

amplify each given reoriented pump laser pulse of the plurality of reoriented pump laser pulses before it exits the optical subsystem, and transmit the plurality of reoriented pump laser pulses after amplification towards the object to perform an interaction with the object.

11. The system of claim 1, wherein the object is a moving object.

12. The system of claim 1, wherein the sequence of pump laser pulses transmitted by the pump laser device comprises a plurality of pump laser pulses which are coherent according to a coherence criterion.

13. The system of claim 1, wherein the medium is operative to receive sequentially a plurality of pump laser pulses of the sequence of pump laser pulses, wherein a time interval between a reception of successive pump laser pulses of the plurality of pump laser pulses by the medium is shorter than a Brillouin Grating lifetime of the medium.

14. The system of claim 1, wherein the medium enables Stimulated-Brillouin-Scattering, wherein the pump laser device is configured to transmit a given laser pulse of the sequence of pump laser pulses to the medium in a time interval that is within a lifetime of a Brillouin grating generated by an interaction between a pump laser pulse and the phase conjugated reflected probe pulse.

15. The system of claim 1, wherein at least some of the pump laser pulses received by the medium are operative to sustain or enhance a Brillouin grating previously generated in the medium.

16. The system of claim 1, comprising at least one optical amplifier configured to amplify the plurality of reoriented pump laser pulses received by the optical amplifier during an amplification cycle, wherein a total energy of the plurality of reoriented pump laser pulses, after their amplification, for the amplification cycle is equal to or larger than 1 mJ.

17. The system of claim 1, wherein the optical subsystem comprises at least one optical amplifier configured to both:

amplify the reflected probe pulse, and amplify the plurality of reoriented pump laser pulses.

18. The system of claim 1, configured to:

trigger an optical amplifier, during a time-window in which the optical amplifier is operative to perform amplification, perform at least once operations including (1) to (9):

(1) transmit, by the probe laser device, a probe pulse towards the object, thereby obtaining, after reflection of the probe pulse on a reflection area of the object, a reflected probe pulse, (2) receive, by the optical amplifier, the probe reflected pulse reflected by the object, (3) receive, by the phase conjugation mirror of the reorientation module, the probe reflected pulse after its amplification by the optical amplifier, (4) generate a phase conjugated reflected probe pulse which is phase conjugated with the reflected probe pulse, (5) receive, by the medium:

the phase conjugated reflected probe pulse, and sequentially a plurality of pump laser pulses of the sequence of pump laser pulses, (6) create, in the medium, a Brillouin Grating, as a result of an interaction of the reflected phase conjugated probe laser pulse and a pump laser pulse of the sequence of pump laser pulses, (7) reflect, by the medium, the plurality of pump laser pulses as a plurality of reoriented pump laser pulses, (8) amplify, by the optical amplifier, the plurality of reoriented pump laser pulses, and (9) use the plurality of reoriented pump laser pulses after their amplification to illuminate the object.

19. The system of claim 1, wherein the optical subsystem comprises at least one optical device configured to both:

receive the probe reflected pulse, and transmit the plurality of reoriented pump laser pulses after amplification to illuminate the object.

20. The system of claim 1, wherein:

the probe laser device is configured to transmit a first probe pulse towards the object, thereby obtaining, after reflection of the first probe pulse on a first reflection area of the object, a first reflected probe pulse propagating along a first reflected probe path up to the film polarizer of the reorientation module, the pump laser device is configured to transmit a first sequence of pump laser pulses, wherein the reorientation module is operative to use the phase conjugate mirror to generate a first phase conjugated reflected probe pulse, which is phase conjugated with the first reflected probe pulse, receive sequentially a plurality of pump laser pulses of the first sequence of pump laser pulses, reflect, using the medium, the plurality of pump laser pulses as a plurality of first reoriented pump laser pulses exiting the film polarizer of the reorientation module along a path coinciding with the first reflected probe path, to illuminate the object, the probe laser device is configured to transmit a second probe pulse towards the object, thereby obtaining, after reflection of the second probe pulse on a second reflection area of the object, a second reflected probe pulse propagating along a second reflected probe path up to the film polarizer of the reorientation module, the pump laser device is configured to transmit a second sequence of pump laser pulses, wherein the reorientation module is operative to use the phase conjugate mirror to generate a second phase conjugated reflected probe pulse, which is phase conjugated with the second reflected probe pulse, receive sequentially a plurality of pump laser pulses of the second sequence of pump laser pulses, reflect, using the medium, the plurality of pump laser pulses as a plurality of second reoriented pump laser pulses exiting the film polarizer of the reorientation module along a path coinciding with the second reflected probe path, to illuminate the object, wherein a time interval between reception of a last laser pulse of the first sequence of pump laser pulses by the reorientation module and reception of a first laser pulse of the second sequence of pump laser pulses by the reorientation module is longer than the Brillouin Grating lifetime of the medium.

21. The system of claim 1, wherein the medium is an active Stimulated Brillouin Scattering (SBS) medium.

22. The system of claim 1, wherein a frequency of transmission of the pump laser pulses within the sequence by the pump laser device is between 100 MHz and 2 GHz.

23. The system of claim 1, wherein the probe laser device is mounted on a first platform, and the pump laser device is mounted on a second platform which is distinct from the first platform.

24. The system of claim 1, wherein the matching criterion is such that the absolute value of a spectral shift between the probe laser device and the pump laser device is smaller than half of the sum of:

a spectral width of the probe laser device, and a spectral width of the pump laser device.

25. The system of claim 1, wherein:

the phase conjugate mirror comprises a medium comprising a first material, the medium of the reorientation module comprises a second material, wherein the first material and the second material are identical.

26. The system of claim 1, wherein the medium of the reorientation module comprises:

a liquid, wherein the liquid optionally includes at least one of CBrCl3, CHCl3, GeCl4, CCl4, C2Cl4, SiCl4, (CH3)3CCl, CS2, TiCl4, ICl, IF5, C6F14, CSe2, AsCl3, Acetone, H2O and Freon, or a gaseous material, or a solid crystal.

27. The system of claim 1, configured to:

for a first object illuminated by a first probe pulse, a first reflected probe pulse is generated which it is received by the optical subsystem with a first incidence angle $\alpha 1$, wherein a path of the first reflected probe pulse from its reflection by the object up to a film polarizer of the reorientation module is designated as a first reflected probe path, wherein the reorientation module is configured to generate first reoriented pump laser pulses, wherein each given reoriented pump laser pulse of the plurality of first reoriented pump laser pulses exits the film polarizer of the reorientation module along a path coinciding with the first reflected probe path, to illuminate the first object, for a second object illuminated by a second probe pulse, a second reflected probe pulse is generated, which it is received by the optical subsystem with a second incidence angle $\alpha 2$ different from $\alpha 1$, wherein a path of the second reflected probe pulse from its reflection by the object up to a film polarizer of the reorientation module is designated as a second reflected probe path, wherein the reorientation module is configured to generate second reoriented pump laser pulses, wherein each given reoriented pump laser pulse of the plurality of second reoriented pump laser pulses exits the film polarizer of the reorientation module along a path coinciding with the second reflected probe path, to illuminate the object, wherein the system enables maintaining a fixed orientation of the optical subsystem to illuminate the first object with the first reoriented pump laser pulses and the second object with the second reoriented pump laser pulses.

28. A method comprising:

transmitting a probe pulse towards an object, thereby obtaining, after reflection of the probe pulse from a reflection area of the object, a reflected probe pulse, receiving the reflected probe pulse by an optical subsystem comprising a reorientation module, wherein the reorientation module comprises a film polarizer, a medium, a phase conjugate mirror, wherein a path of the reflected probe pulse from its reflection by the object up to the film polarizer of the reorientation module is designated as a reflected probe path, generating, by the reorientation module, a phase conjugated reflected probe pulse, which is phase conjugated with the reflected probe pulse, receiving, by the medium:

the phase conjugated reflected probe pulse, and sequentially, a plurality of pump laser pulses of a sequence of pump laser pulses generated by a pump laser device, thereby generating, in the medium, a grating, wherein the pump laser pulses have a wavelength which match a wavelength of the probe pulse according to a matching criterion, reflecting, using the grating in the medium, the plurality of pump laser pulses as a plurality of reoriented pump laser pulses, wherein each given reoriented pump laser pulse of the plurality of reoriented pump laser pulses exits the film polarizer of the reorientation module along a path coinciding with the reflected probe path, to illuminate the object.

* * * * *